United States Patent [19]

Ahuja et al.

[11] Patent Number: 5,689,553
[45] Date of Patent: Nov. 18, 1997

US005689553A

[54] MULTIMEDIA TELECOMMUNICATIONS NETWORK AND SERVICE

[75] Inventors: Sudhir Raman Ahuja, Aberdeen; Murali Aravamudan, Berkley Heights; James Robert Ensor, Red Bank; Ashok K. Kuthyar, Holmdel; Ram S. Ramamurthy, Manalapan; Peter H. Stuntebeck, Little Silver; Roy Philip Weber, Bridgewater, all of N.J.

[73] Assignee: AT&T Corp., Middletown, N.J.

[21] Appl. No.: 51,724

[22] Filed: Apr. 22, 1993

[51] Int. Cl.$^6$ ................................................. H04M 3/56
[52] U.S. Cl. .................... 379/202; 379/89; 379/205; 379/90; 370/260; 370/352; 348/15
[58] Field of Search .................. 379/67, 88, 89, 379/90, 93, 94, 100, 127, 202, 204, 205, 206; 348/14, 15, 17; 370/60, 60.1, 62, 94.1, 85.13, 85.14

[56] References Cited

U.S. PATENT DOCUMENTS

| | | | |
|---|---|---|---|
| 4,796,293 | 1/1989 | Blinken et al. | 379/202 |
| 5,065,392 | 11/1991 | Sibbitt et al. | 370/62 |
| 5,113,431 | 5/1992 | Horn | 379/205 |
| 5,136,634 | 8/1992 | Rae et al. | 379/100 |
| 5,192,999 | 3/1993 | Graczyk et al. | 358/85 |
| 5,193,110 | 3/1993 | Jones et al. | 379/94 |
| 5,195,086 | 3/1993 | Baumgartner et al. | 370/62 |
| 5,220,560 | 6/1993 | Ogasawara | 379/94 |
| 5,323,445 | 6/1994 | Nakatsuka | 379/94 |
| 5,371,534 | 12/1994 | Dagoleviren et al. | 379/94 |
| 5,384,771 | 1/1995 | Isidoro et al. | 370/62 |
| 5,408,526 | 4/1995 | McFarland et al. | 379/202 |
| 5,418,844 | 5/1995 | Morrisey et al. | 379/207 |
| 5,450,123 | 9/1995 | Smith | 348/17 |

FOREIGN PATENT DOCUMENTS

| | | | |
|---|---|---|---|
| 9316545 | 8/1993 | WIPO | 379/202 |

OTHER PUBLICATIONS

"Multimedia Telephone Caller Recognition" IBM Technical Disclosure Bulletin, vol. 34 No. 10A Mar. 1992.

"Personal Visual Communications Enters the Marketplace", J. Angiolillo and J.A. Hicks, AT&T Technology, vol. 7, No. 3, Fall 1992, pp. 18–23.

"The Promise of Multimedia Communications", D. Brittan, Technology Review, May/Jun. 1992, pp. 43–50.

"The Coming HDTV Wave", R.L. Cerbone, AT&T Technology, vol. 7, No. 3, Fall 1992, pp. 14–17.

"Creating Tomorrow's Multimedia Systems Today", A. C. Englander and K. H. Rosen, AT&T Technology, vol. 7, No. 3, Fall 1992, pp. 24–30.

"The Rapport Multimedia Conferencing System—A Software Overview", J.R. Ensor et al., Proceedings of the 2nd IEEE Conference on Computer Workstations, Santa Clara, CA, Mar. 7–10, 1988, pp. 52–58.

"Videoconferencing Systems: Seeing is Believing", D. E. Harvey et al., AT&T Technology, vol. 7, No. 3, Fall 1992, pp. 7–13.

(List continued on next page.)

*Primary Examiner*—Fan Tsang
*Attorney, Agent, or Firm*—Thomas A. Restaino

[57] ABSTRACT

A multimedia telecommunications network provides telephone service which may involve one or more of audio, video, and data communications. In one example of the invention, the multimedia telecommunications network contains a virtual meeting services complex which provides multimedia telecommunications service to subscribers of the network. Multimedia telephone calls can be completed automatically by the virtual meeting services complex in a manner similar to that now used to complete conventional audio telephone calls. The multimedia telecommunications network containing this virtual meeting services complex is able to connect together users having diverse equipment and is able to handle integrated and nonintegrated network access mechanisms.

35 Claims, 17 Drawing Sheets

OTHER PUBLICATIONS

"A New Metaphor for Multimedia Desktop Conferencing Systems", Georg Michelitsch, IEEE Multimedia '90, Bordeaux, Nov. 14–17, 1990, pp. 1–6.

"A Distributed Cooperative Model for Multimedia Applications", A. Karmouch, date unknown.

"Versatile Services Streamline Global Videoconferencing", J. L. Posko, AT&T Technology, vol. 7, No. 3, Fall 1992, pp. 2–6.

MULTIMEDIA TELECOMMUNICATIONS NETWORK AND SERVICE

CROSS-REFERENCE TO RELATED APPLICATION

This application is related to application Ser. No. 08/052, 492 of Ahuja, Aravamudan, and Ensor filed in the Patent and Trademark Office on the same day this application is being filed.

1. Technical Field

This invention relates to telecommunications networks. More particularly, this invention relates to multimedia telecommunications networks able to provide convenient, efficient, and flexible multimedia telephone service and the like involving voice, video, and data.

2. Background

Some of the characteristics of face-to-face meetings can be simulated in a primitive way by existing multimedia conferencing systems. Such conferencing systems permit separated conference participants to communicate in a limited fashion with one another in multiple media such as voice, video, and data from separate places without requiring that they actually convene in the same place.

In one prior approach, these conferencing systems involve a plurality of complicated and expensive multimedia computer workstations connected together by single type of transmission facility such as ISDN which acts merely as a transport mechanism for whatever is to be communicated between the workstations. There are significant problems with such a distributed architecture which are preventing this approach from becoming a widespread commercially viable reality. Each of the workstations in prior distributed environments contains a large amount of the multimedia data processing capabilities, including the necessary bridging and synchronization circuits, used to effectuate a conference between meeting participants. This increases the cost to each potential multimedia user which usually places multimedia communications beyond that user's interest or financial means. In addition, prior localized desktop applications make it difficult to conveniently achieve long-term flexible multimedia conferencing environments because at least one of the workstations must stay up at all times during the required life of the conference environment. There is no convenient way for all the conferees to leave the conference and then easily return and pick up the conference where it left off. It also is difficult to synchronize the various parts of a multimedia conference for proper presentation to the meeting participants in a distributed environment. In this situation, it is difficult to create multimedia connections between disparate communications equipment, for example, two computers running different operating systems. Also, two or more workstations using different transport mechanisms such as ISDN and Frame Relay could not easily communicate with each other.

In addition to the distributed architectures described above, there are some centralized architectures involving media bridges located in the network rather than in local workstations. For example, the AT&T long distance network contains some audio and video bridging capability such as the bridging involved in the AT&T Alliance Teleconferencing Service and the AT&T Global Business Video Conferencing Services. Although these services are useful telecommunication services, Applicants have identified significant areas which might be improved. Applicants have appreciated that it is difficult to achieve flexible, long term multimedia conferences between a variable number of users having different media capabilities and different access mechanisms. Synchronous modes of communications, such as telephone calls, and asynchronous modes of communications, such as electronic mail, are not easily merged in the prior centralized multimedia communications systems. Those multimedia communications systems also make it difficult to integrate disparate communications equipment possessed by various conferees into an effective multimedia conference. It is difficult for conferees having different levels of multimedia communications capabilities to freely enter and leave a given multimedia conference. There is no convenient way to effectuate multimedia communications between many potential users such as those who might be connected together by way of a complicated network, such as an extensive local area network or a wide area network such as a public telephone network. For example, there is no way for a telecommunications carrier to provide a multimedia communications service to a wide range of its telephone customers using the present multimedia conferencing systems. In addition, emerging new communications networks such as ATM and B-ISDN networks aimed at higher speed services, cannot be easily accommodated by these multimedia conferencing systems.

SUMMARY

There is a bewildering array of existing devices which can communicate in a variety of different media, such as one or more of audio, video, and data. In many instances, those communication devices are incompatible with one another. Applicants have determined that it would be advantageous if there were some way to utilize existing as well as newly developed communications devices to effectuate multimedia conferences and thereby simulate actual face-to-face meetings. Applicants, therefore, have developed a specially configured multimedia telecommunications network which may provide convenient and transparent telecommunication services which may be obtained in a manner which is not very much different from the manner in which ordinary telephone calls are made today. This multimedia telecommunications network provides a shared multimedia work environment readily accessible by subscribers to the services provided by the network. Subscribers can access these services using integrated access mechanisms such as N-ISDN and emerging ATM and B-ISDN access mechanisms for all media, or separate nonintegrated access through distinct networks for different media. Applicants' invention has at least two important aspects. One aspect is a novel telecommunications network architecture which facilitates the handling of multimedia communications between any number of conference participants, who may have varying media communications capabilities. Another aspect is a group of multimedia telecommunication services which may be conveniently offered by a multimedia telecommunications network such as the previously mentioned multimedia telecommunications network.

In one specific example of a network architecture in accordance with this invention, a telephone network provides multimedia telephone services to the subscribers of the network. In specific terms, the multimedia telephone network comprises virtual meeting services equipment located in the network and connected to a plurality of ports which provide users with access to the telephone network. The virtual meeting services complex creates a special electronic circuit configuration in the network in response to a command from a subscriber terminal connected to one of the ports of the network. The command may be a data signal from a computer or from a telephone. In either case, all the appropriate data, video, and audio triggers are invoked automatically. The electronic circuit configuration may be a data structure which represents a persistent virtual meeting room in the network. Conferences may be held using this meeting room involving any number of participants. Those conference participants may be able to communicate with the others in a variety of media. They need not each have the same ability to communicate in all media. The participants may come and go with respect to conferences held in the virtual meeting room. Even when all participants leave a conference by going on hook, the virtual meeting room may persist in the network, if desired by the participants, and may be used at a later time by the same participants or by others to resume or continue the conference. The meeting room may be used by the same or different participants to initiate or continue other conferences. The virtual meeting room is thus an electronic analog of a physical meeting place where conferences are held.

An example of a telephone service which may be provided in accordance with this invention comprises a method of creating a multimedia telephone call between at least two multimedia telephone service subscribers comprising a step of receiving a telephone call placed by a calling party to a virtual meeting services node in a telephone network. The method further comprises the step of creating a virtual meeting room in the network, associating the calling party with the virtual meeting room, and establishing an association with one or more called parties and the virtual meeting room. The parties are connected together to effectuate a telephone call carried out in multiple preselected media such as voice, video, and data.

In another example of a telephone service which may be provided to multimedia services subscribers, a multimedia telephone call between at least two parties may be created by receiving a directory number of one or more called parties from a calling party and determining whether the calling party and at least one of the called parties are subscribers to a virtual meeting service offered by the telephone network. The calling party and the called parties are automatically connected to a virtual meeting services node in the network which creates a persistent virtual meeting room used by the parties to facilitate automatic creation of connections between the parties in predetermined multiple media.

This summary only deals with examples of Applicants' invention. The full scope of the invention is defined in the claims at the end of this application.

DETAILED DESCRIPTION

Figure 1:
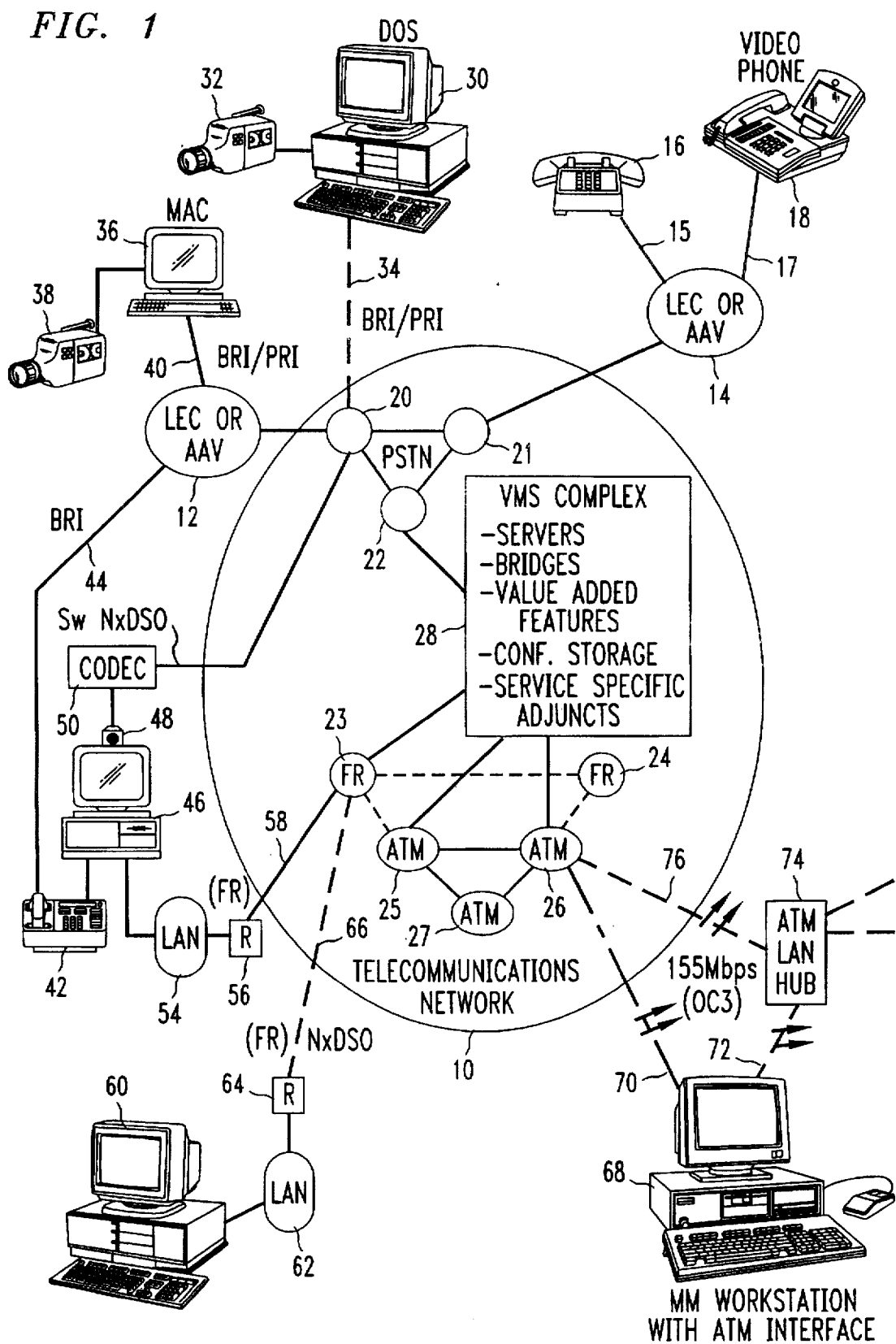
FIG. 1 is an example of a multimedia telecommunications network in accordance with this invention.

FIG. 1 shows an example of a multimedia telecommunications network 10 providing a multimedia virtual meeting service in accordance with this invention. The network 10 of FIG. 1 is a convenient mechanism by which disparate communications devices may be integrated into multimedia conferences involving one or more of audio, video, and data. The network 10 comprises a plurality of nodes for completing telephone calls between subscribers connected to the network. The network 10 contains at least one virtual meeting services complex associated with at least one of the nodes which provides multimedia telecommunications service for subscribers connected to the network. A multimedia telephone call between two multimedia telephone service subscribers is created by first receiving a telephone call from a calling party to the virtual meeting services complex in the network. The complex may then create a virtual meeting room in response to receipt of the telephone call. The calling party next is connected to the virtual meeting room and following that a connection is established between one or more called parties and the virtual meeting room to create a multimedia telephone call between the calling party and one or more called parties. The calling party may access the virtual meeting services complex by dialing a toll free telephone number such as an 800 number associated with the virtual meeting services complex. The complex may prompt the calling party for certain information in response to receipt of this telephone call, such as information about the called party and information to authenticate the calling party.

In the example of FIG. 1 a long distance telecommunications network 10, such as the long distance network provided by AT&T, is connected to a number of local telephone networks 12 and 14 provided by local exchange carriers or alternate access vendors (AAV's). The local networks 12 and 14 may be composed of one or more interconnected central office switching systems, such as the AT&T 5ESS® switching systems. A number of communications devices are connected to the telecommunications network 10 through the networks 12 and 14. Other communications devices may be connected directly to the telecommunications network 10 or through AAV's.

The telecommunications network 10 shown in FIG. 1 comprises a number of distinct network components. The network 10 may contain the usual public switched long distance telephone network composed of a plurality of interconnected network nodes 20, 21, and 22 each having a switching system, such as the AT&T 4ESS™ switching system. The network 10 also may contain one or more packet networks such as a frame relay data network composed of a plurality of interconnected frame relay nodes 23 and 24 and an asynchronous transfer mode (ATM) network composed of a plurality of interconnected ATM nodes 25, 26, and 27. Although an asynchronous packet network such as an ATM network is shown in FIG. 1, synchronous packet networks such as those using the synchronous digital hierarchy (SDH) or synchronous optical network (SONET) standards may also be in the network 10. Basically, any all electrical, electro-optical, or all optical network can be used in a multimedia network in accordance with this invention.

In addition to these networks, the network 10 contains circuitry which effectuates a virtual meeting service (VMS) for the subscribers of the network 10. In FIG. 1 this virtual meeting services circuitry is shown as a centralized complex 28 connected to the public switched telephone network portion, the frame relay network portion, and the ATM portion of the telecommunications network 10. Alternatively, the virtual meeting services circuitry may be distributed over a number of different pieces of equipment in the network 10, as appropriate. Each piece of virtual meeting services circuitry does not need to have the same capabilities as the others. For example, there may be a complex or adjunct associated with one or more desired network nodes shown in FIG. 1. There may also be virtual meeting services capability programmed into any desired existing node in the network 10. There may be a node partially or exclusively dedicated to effectuating multimedia telecommunications service. Although FIG. 1 shows a virtual meeting service capability in a long distance network, that capability may also be associated with any one or more of the nodes of the local networks 12 and 14 or even with a node in a customer premises network or other private telecommunications network. The VMS complex 28 shown in FIG. 1 either contains or is able to access a group of media bridges which provide the connections between parties involved in multimedia conferences using the network 10. The activities of the bridges used in each conference are coordinated by respective media servers. The bridges may be separate devices accessed by the servers or the bridges may be integral parts of the servers, such as software entities programmed into computers which perform the server functions. The VMS complex 28 also may contain circuitry which performs various value added features described in more detail below. The complex 28 also may contain some service specific adjuncts and one or more devices for storing certain predetermined aspects of conferences held through the VMS complex.

The example of FIG. 1 shows a regular voice telephone 16 connected to the local network 14 via a subscriber line 15. Alternatively, the telephone 16 may be any form of wireless telephone connected to the local network 14 through an intermediate wireless network such as a cellular telephone network. FIG. 1 also shows a video phone 18 connected to the local network 14 by means of a subscriber line 17.

FIG. 1 also shows an MS-DOS computer 30 connected to a camera 32. The computer 30 is directly connected to the node 20 in the network 10 by means of ah integrated access line 34 comprising either a basic rate interface (BRI) or a primary rate interface (PRI). FIG. 1 also shows a Macintosh type computer 36 connected to a camera 38. The computer 36 is connected to the local network 12 by means of an integrated access line 40 functioning as either a BRI or a PRI. FIG. 1 also shows a multimedia workstation able to communicate in audio, video, and data. This workstation is given non-integrated access to the network 10. It comprises a voice telephone 42, such as an ISDN telephone, connected to the local network 12 by means of a line 44 functioning as a BRI and connected to a workstation 46 which may be a workstation manufactured by Sun Microsystems. There may be a PBX between the telephone 42 and the local network 12 or there may be a Centrex capability in the local network 12 associated with the connection between the telephone 42 and the network 12. The workstation is associated with a video camera 48 the output of which is sent to a codec 50 whose output is directed to the node 20 in the network 10 by means of a line 52 handling an integral number of DS0 channels. Data from the workstation 46 is directed to a local area network (LAN) 54 and then to a router 56. The output of the router 56 is directed on a line 58 to the node 23 in the frame relay network in network 10. FIG. 1 also shows a computer 60 whose data output is directed to a LAN 62, a router 64, and then to the frame relay node 23 by means of a line 66 handling an integral number of DS0 channels. Finally, FIG. 1 shows a multimedia workstation 68 which communicates in audio, video, and data with the ATM portion of the network 10. A workstation like the workstation 68 in FIG. 1 may communicate with the network 10 in several alternative ways. A first way is by means of a direct optical link 70 to one of the ATM nodes 26 in the ATM portion of the network 10. A second way is by means of an optical link 72 to an ATM LAN 74 and then by means of an optical link 76 from the LAN 74 to a node 26 in the ATM portion of the network 10. Although element 74 is shown in FIG. 1 to be an ATM LAN hub, it may also be a multiplexer, a PBX, a router, a switch, a concentrator, or any other ATM access mechanism. The optical links used by the multimedia ATM workstation 68 in FIG. 1 may function as a 155 Mbps (OC3) optical links. Instead of optical links 70, 72, and 76, electrical connections may be used. Although FIG. 1 shows the computer 30, 36, 46, 60, and 68 as having specific operating systems, it should be kept in mind that these are only examples. Computers running any operating system can be given access to the network 10 in the illustrative ways shown in FIG. 1. Also, although frame relay network is shown in FIG. 1 as the data network, it is only an illustrative example. Other data networks such as X.25 networks can be used.

The telecommunications network 10 shown in FIG. 1 having a virtual meeting services circuitry and capability is able to create connections in any preselected media between any of the diverse communications devices possessed by network subscribers, such as the representative devices shown in FIG. 1 as being connected to the network 10. These connections in predetermined media are facilitated by the creation of controllably persistent virtual meeting rooms in the network by the virtual meeting services circuitry. The details of these virtual meeting rooms and the electronic circuitry used to create them are more fully described in the previously mentioned patent application cross-referenced above, the entire content of which is hereby incorporated by reference into this application.

Figure 2:
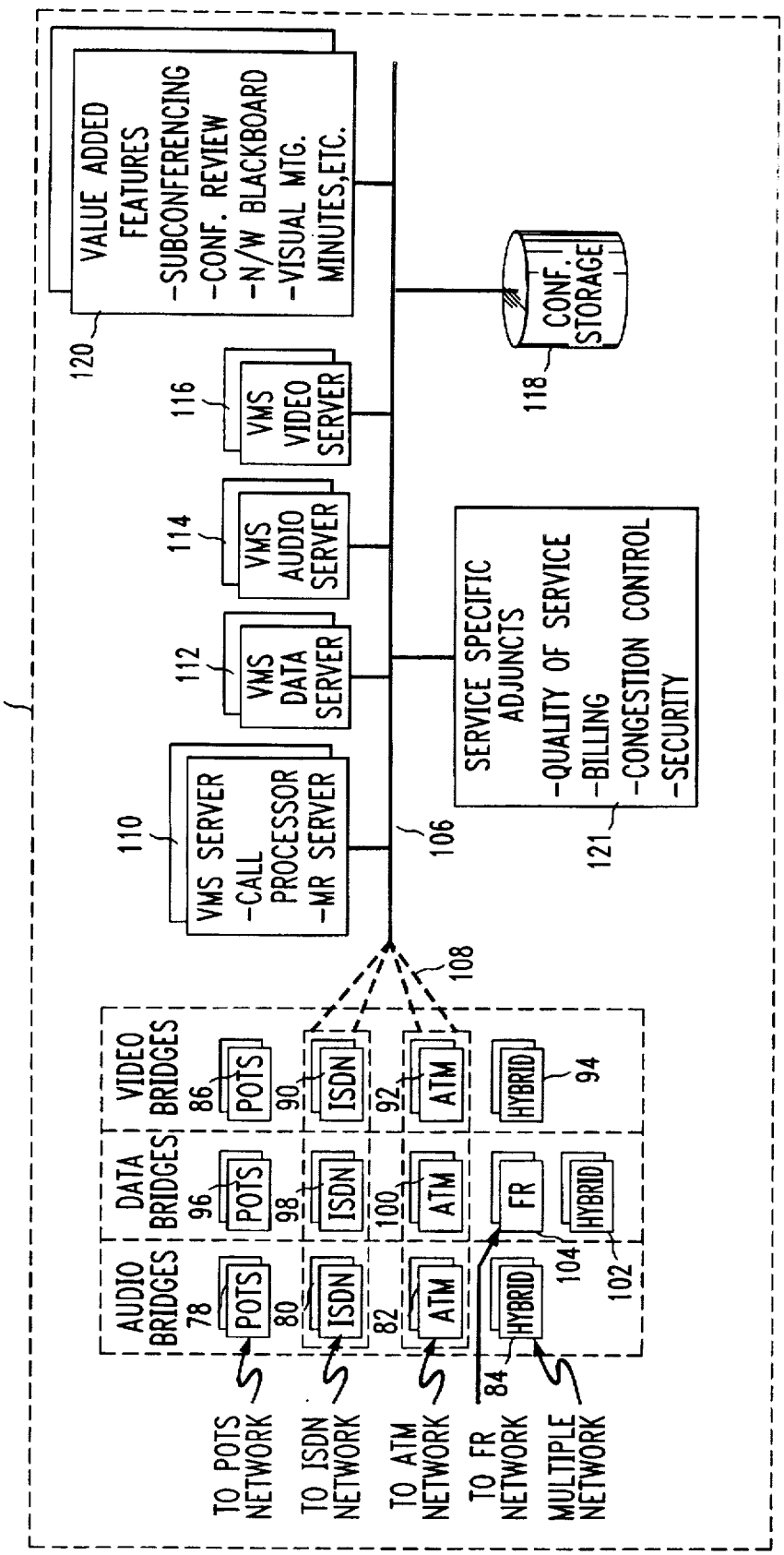
FIG. 2 is a circuit diagram illustrating an example of the virtual meeting services complex shown in FIG. 1.

FIG. 2 shows the details of an illustrative VMS complex 28 shown generally in FIG. 1. The complex 28 shown in FIG. 2 contains a number of different bridging resources which are used to effectuate conferences between two or more conferees in one or more preselected media. The complex 28 contains audio bridges, data bridges, and video bridges. Each of those bridges is capable of receiving respective media inputs from the conferees and directing selected ones of those inputs back to selected conferees. There are several different categories of each kind of media bridge. In the case of the audio bridges, there are one or more POTS bridges 78 which receive POTS signals from conferees and direct selected ones of those POTS signals to preselected conferees. Similarly, there are one or more ISDN bridges 80 and ATM bridges 82 which perform similar functions with respect to ISDN and ATM audio signals produced by the conferees. The group of audio bridges also contains one or more hybrid bridges 84 which receive different kinds of signals from subscribers using different kinds of audio communications devices, for example, the hybrid bridge may receive signals from conferees using POTS devices and signals from conferees using ISDN devices. The hybrid bridges are capable of converting audio signals of one type into audio signals of another type so that subscribers using dissimilar equipment may be able to communicate with one another. For example, a hybrid bridge may receive POTS audio from a POTS telephone user, may convert the POTS audio to ISDN format, and then transmit signals in the ISDN format to subscribers using ISDN equipment, and vice versa.

The collection of media bridges in the complex 28 also includes several different kinds of video bridges similar to the kinds of audio bridges in the complex 28. Specifically, the video bridges in the complex 28 include one or more POTS video bridges 86, one or more ISDN video bridges 90, one or more ATM video bridges 92, and one or more hybrid video bridges 94. Those video bridges perform functions for conferee video signals analogous to the functions performed by the audio bridges 78, 80, 82, and 84 for the audio portions of the conferee signals. Similarly, the complex 28 contains a group of several different kinds of data bridges performing like functions with respect to the data signals produced by the conferees. Specifically, the complex 28 contains one or more POTS data bridges 96, one or more ISDN data bridges 98, one or more ATM data bridges 100, and one or more hybrid data bridges 102. The group of data bridges also comprises one or more frame relay data bridges 104. It should be kept in mind that although these bridges are shown as separate audio, data, and video bridges, the separation is only needs to be logical. The bridges may be an integrated multimedia bridge where possible and available. This is illustrated by the representative dashed lines around ISDN and ATM bridges. In this example of the invention, the bridges are shown as separate circuits. They could also be a part of other circuitry in the complex 28, such as the servers described below.

The media bridges may be bridges which are specifically dedicated to the complex 28 or they may be already existing bridges in a telecommunications network 10, the functions of which may be accessed by the complex 28 through the network 10. For example, the audio bridges may involve an existing AT&T Alliance teleconferencing bridge and the like; the video bridges may involve the audio and video bridges in the AT&T Global Business Video Conferencing Service and the like. The media bridges shown in FIG. 2 are connected to a local area network 106 by means of appropriate control interfaces 108.

The complex 28 contains one or more VMS servers 110 connected to the local area network 106. Each VMS server 110 contains a call processor which handles telephone calls made to the VMS complex 28 by subscribers and made to the complex 28 by automatic calling equipment in the network 10. VMS servers 110 also contain a conference control circuit which coordinates the equipment in the complex 28 in the course of handling a multimedia telephone conference. This conference control circuit is analogous to the meeting room servers described in the patent application mentioned above. The complex 28 also contains one or more VMS data servers 112, one or more VMS audio servers 114, and one or more VMS video servers 116 connected to the local area network 106. These VMS media servers are analogous to respective media servers described in the application mentioned above. The VMS complex 28 also contains a conference storage device 118 which is used to record various aspects of multimedia conferences handled by the complex 28. For example, the conference storage device 118 may contain audio and video recordings of predetermined parts of multimedia conferences; the storage device 118 may also contain certain data generated in the course of executing computer programs which are shared by conference participants in the network, such as multimedia meeting minutes, users' files, shared blackboard information or files, and the like.

The complex 28 may also contain one or more pieces of circuitry 120 which provide special value added features to users of the virtual meeting service provided by the network 10. Those value added features may include a subconferencing function involving the ability of a certain subset of the entire group of participants involved in a single conference to break away from the conference and confer privately with one or more of the other conference participants or with one or more outsiders without the other conferees being able to participate in the private conversation. An additional value added function which may be provided by the circuitry 120 includes a signalling capability used in a situation where one of the participants of a conference is placed on hold. Rather than the person on hold being at the mercy of the other conferees regarding re-entry into a conference, this feature allows the conferee on hold to signal the others that he or she wishes to re-enter the conference. This avoids a problem of an undue amount of time being spent on hold. The value added features may also include a conference review feature whereby the past history of a conference as stored in the device 118 may be played back to selected individuals. Also, the value added features may also include a network blackboard feature in which a certain virtual space may be created in the network 10 and communicated to the conferees who may then make certain data, video, or other entries into the space which can be observed by the other conferees. This network blackboard thus simulates an actual blackboard or similar writing space which might be used in an actual face-to-face conference. Other possible features provided by the circuits 120 include the ability to provide visual or other kinds of meeting minutes relating to the conference. The complex 28 may also contain one or more pieces of circuitry 121 which provide special service specific functions. These functions may include a quality of service feature which allows the service to provide different grades of service. This may require the adjunct to ensure availability of appropriate circuitry in one or more networks for a specific conference whenever that conference is started or resumed. An additional feature may be related to billing functions providing information regarding special features used in a conference. A congestion control function may be needed in the service specific adjunct since varying capabilities of network 10 and various circuitry of complex 28 may be in use to different degrees. A security feature may also be needed in the service specific adjunct.

Figure 3:
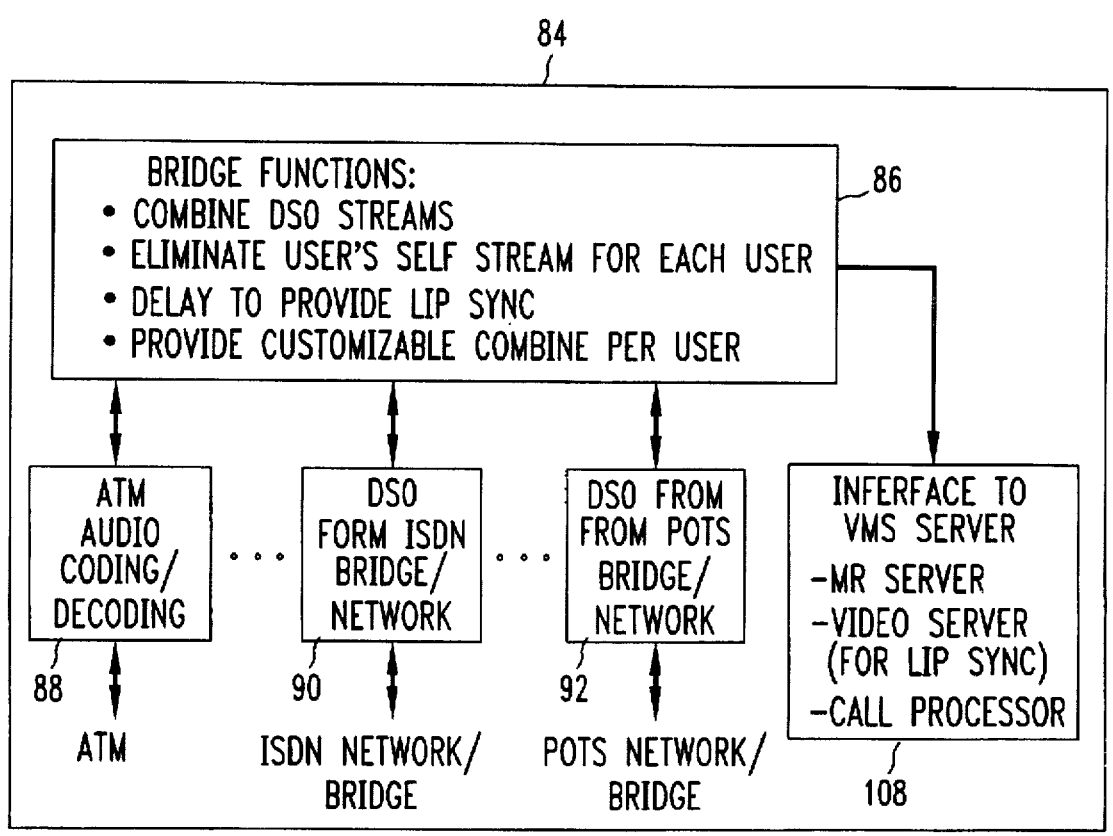
FIG. 3 is a circuit diagram illustrating the details of one of the hybrid audio bridges shown in FIG. 1.

FIG. 3 is a detailed circuit diagram of an example of one of the hybrid audio bridges 84 shown in FIG. 2. The hybrid bridges support multiple networks and may support multiple media. When all the end points to a hybrid bridge are from the same network it is functionally the same as a single network type bridge. The illustrative examples discuss only hybrid bridges, since the other cases are subset or variants of this. This figure illustrates a circuit which bridges audio signals from different networks. The bridge 84 contains circuitry which converts different format signals from a variety of diverse networks into signals in a common format. A bridging circuit 86 receives the common format signals and directs selected ones of those signals back to the diverse networks through the conversion circuitry. Specifically, the bridge 84 in this example contains at least one circuit 88 for converting audio signals in an ATM format from an ATM network into a standard DS0 signal for delivery to the bridge circuitry 86. The circuit 88 also converts audio signals received from the bridging circuitry 86 in the DS0 format into audio signals in the ATM format for delivery to the ATM network. The bridge also contains at least one circuit 90 for converting ISDN audio signals received from an ISDN network into the same DS0 format for delivery to the bridging circuit 86. The circuit 90 also converts DS0 audio signals from the bridging circuitry 86 into ISDN audio signals for delivery to the ISDN network. Similarly, the bridge 84 contains circuitry 92 which receives POTS type audio signals from a POTS network and converts those signals into an audio signal in the DS0 format for delivery to the bridging circuitry 86. The circuit 92 also takes DS0 audio signals from the bridging circuitry 86 and converts those audio signals into POTS type audio signals for delivery to the POTS network.

The bridging circuit 86 is connected with a VMS server 110 through an interface 108 for signalling communications. The interface 108 provides a connection to a meeting room server, a video server for lip synch, and a call processor.

The bridging circuit 86 combines the DS0 signals from the conversion circuits 88, 90, and 92. The bridging circuit 86 directs selected ones of the audio signals from each conferee back to selected ones of the conferees. For example, the bridging circuit 86 may direct to each conferee the sum of the audio signals from the other conferees. The bridging circuit 86 may eliminate each conferees's contribution to the sum from the sum signal directed back to each conferee. The bridging circuit 86 may provide a controllable amount of delay to the audio signals so that the audio signals are synchronized with lip movements presented by the video signals. The bridging circuit 86 may also provide customizable combinations of the audio signals for any of the users. For example, a user may be able to adjust the volume level of any particular participant or may eliminate that participant entirely.

Figure 4:
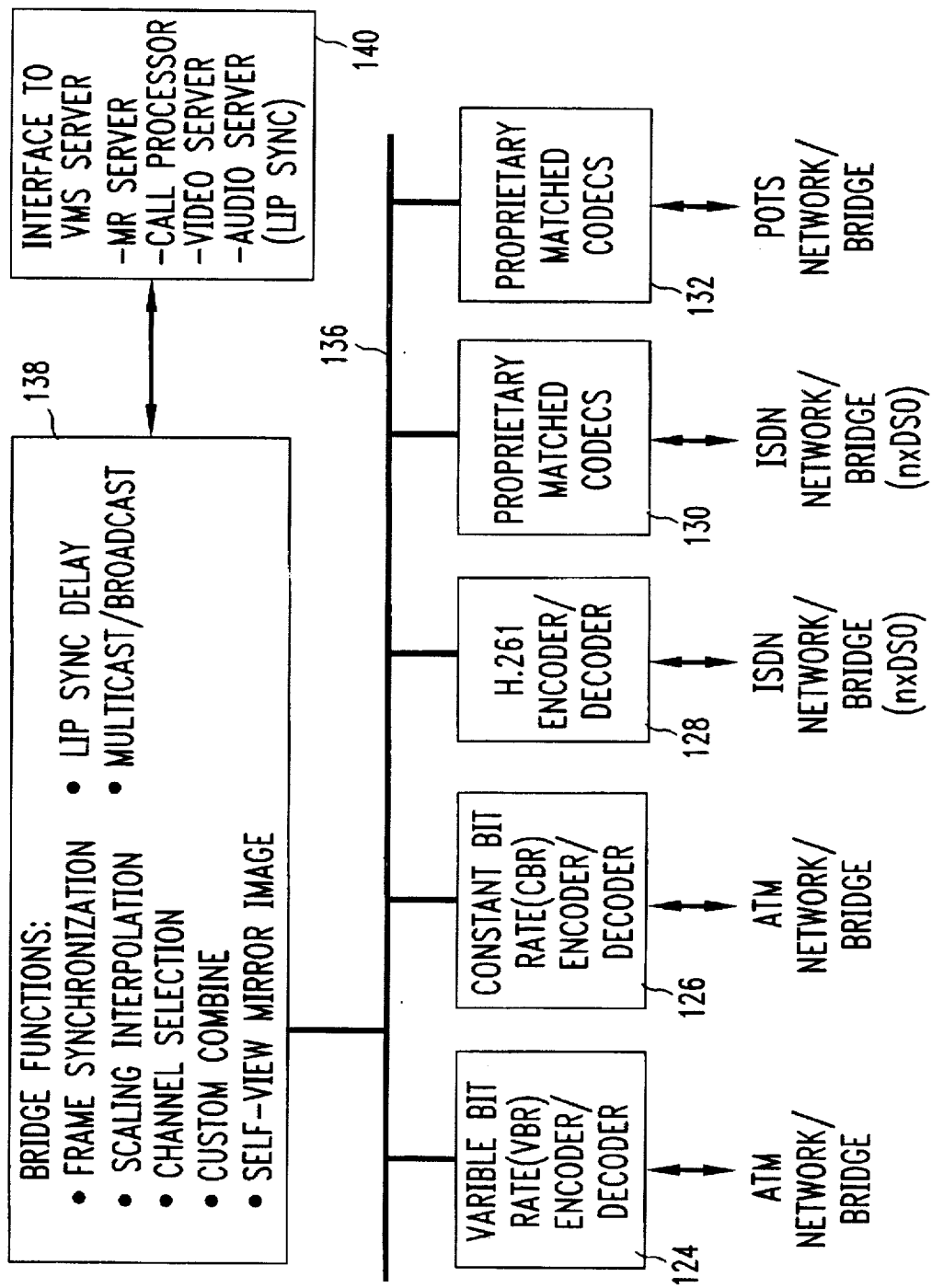
FIG. 4 is a circuit diagram illustrating the details of one of the hybrid video bridges shown in FIG. 1.

FIG. 4 shows the details of an illustrative hybrid video bridge for the VMS complex shown in FIG. 2. The hybrid video bridge contains circuitry for converting video signals in different formats used by diverse video networks into a common format suitable for performing a video bridging function. Specifically, the hybrid video bridge contains a variable bit rate encoder/decoder 124 for handling variable bit rate video signals from an ATM network, a constant bit rate encoder/decoder 126 for handling constant bit rate video signals from an ATM network, an H.261 encoder/decoder 128 for handling video signals from an ISDN network, and codecs 130 and 132 for handling signals from proprietary codecs connected to an ISDN network and a POTS network, respectively. An analog/digital interface 136 provides communications paths to and from a bridging circuit 138 which is connected to other circuitry in the VMS complex by means of an interface 140. Some of the functions provided by the bridging circuit 138 include frame synchronization, scaling interpolation (e.g., size adjustment), channel selection, custom combinations of video signals directed to selected conferees, and a self-view function involving a display of a mirror image to a conferee instead of the actual image created by a video camera. Each participant may thus see himself or herself as he or she would be seen in a mirror. The custom combine function allows the user to define the participants he or she wants to see bridged into one video stream. The bridge may also be used for multicast/broadcast operations.

Figure 5:
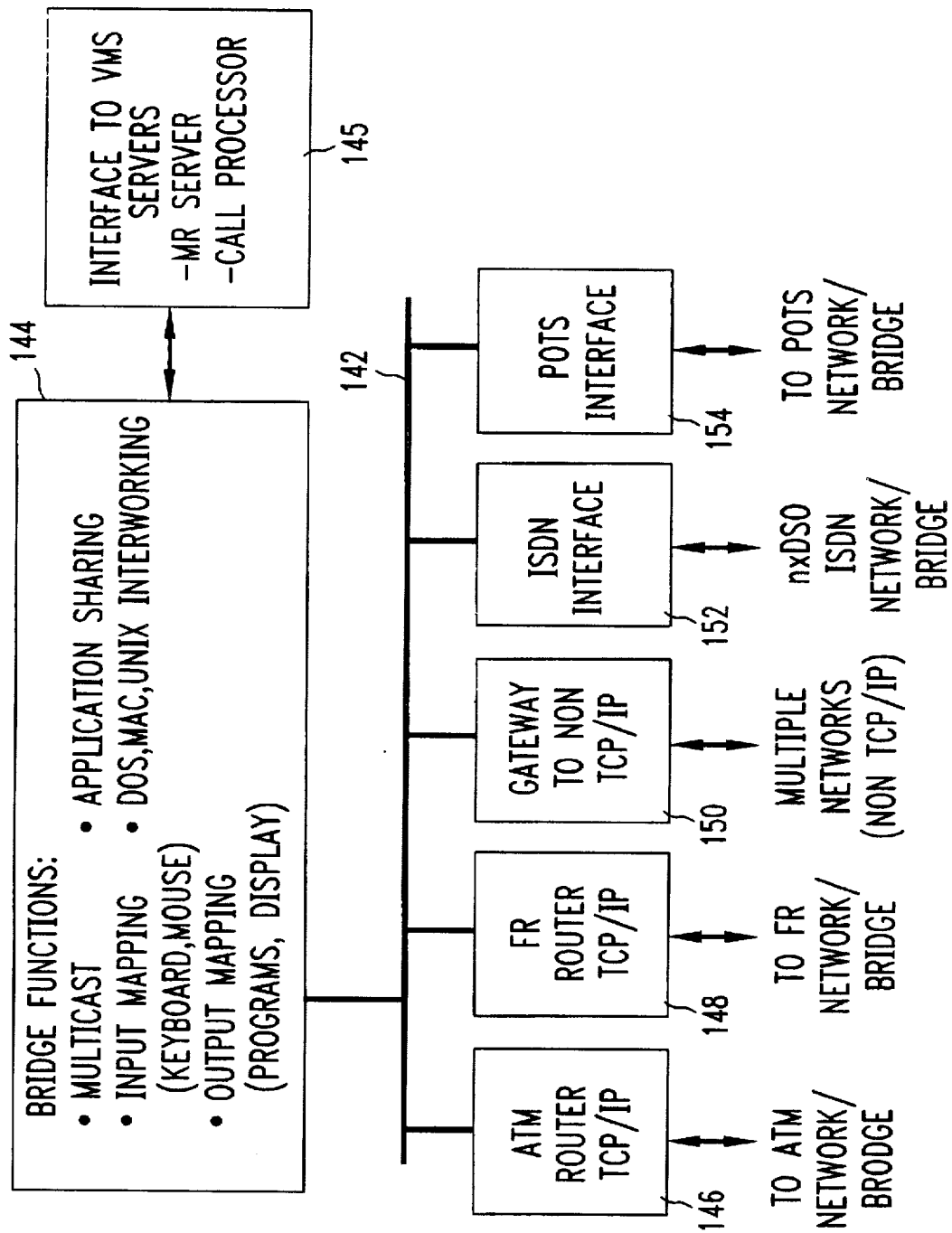
FIG. 5 is a circuit diagram illustrating the details of one of the hybrid data bridges shown in FIG. 1.

Similarly, FIG. 5 illustrates the details of an illustrative hybrid data bridge in the VMS complex of FIG. 2. The data bridge contains appropriate conversion circuitry for converting signals in a variety of formats into common format signals able to be bridged. In this example, the data bridge contains a group of conversion circuits connected by means of a local area network 142 to a bridging circuit 144. An interface 145 connects the bridging circuit 144 to the meeting room server and call processor in the VMS complex of FIG. 2. The group of conversion circuits includes a TCP/IP based ATM router 146 handling signals used by an ATM network, a TCP/IP based frame relay router 148 handling signals used by a frame relay network, a gateway 150 handling signals used by any kind of non-TCP/IP network, an ISDN interface 152 handling signals used by an ISDN network, and a POTS interface 154 handling signals used in a POTS network. The bridging circuit 144 performs a multicast operation involving the communication of data produced by each conferee to selected other conferees to facilitate input sharing in an application. The bridging circuit 144 also maps any input entered by one of the conferees via an input device such as a mouse or keyboard to the computers of the other conferees. The bridging circuit 144 also performs a similar output mapping function with respect to each of the conferees so that each conferee has a common program and display output for shared applications. Each conferee thus may share a computer program running in one of the workstations or in the VMS complex 28 (e.g., a network blackboard) involved in a multimedia conference. The bridging circuit 144 may contain appropriate interface circuitry which converts data signals produced by a computer running a particular operating system into data signals appropriate for a computer running a different operating system. For example, the bridging circuit 144 may contain interface circuitry which permits computers using MSDOS®, Macintosh, and UNIX® operating systems to communicate with one another. This invention, therefore, permits a wide variety of different equipment to conveniently participate in multimedia conferencing.

Figure 6:
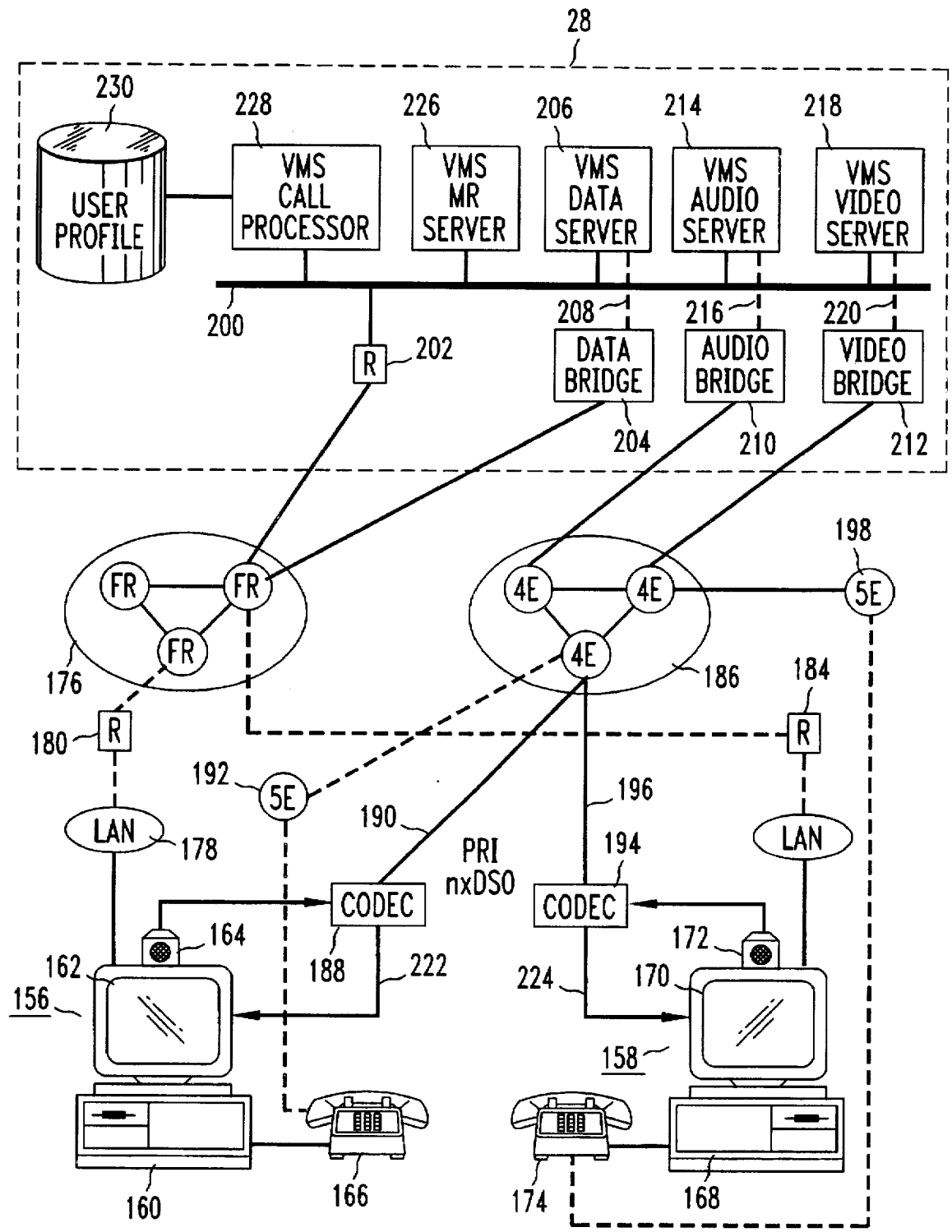
FIG. 6 is a circuit diagram of pertinent aspects of the telecommunications network of FIG. 1 illustrating a first example of a multimedia telecommunications service in accordance with this invention.
Figure 7:
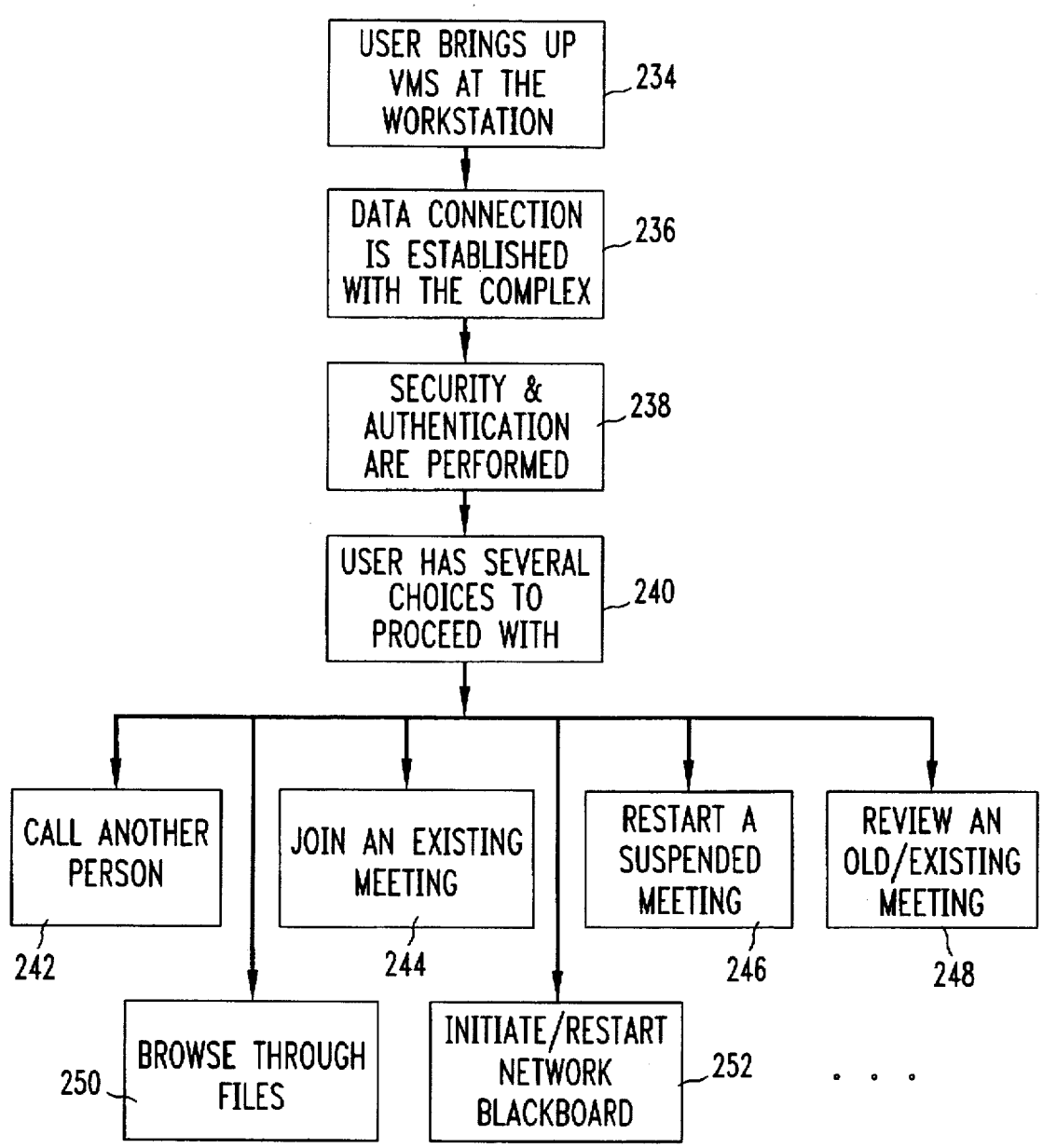
FIGS. 7–11 are flow charts representing the operation of the network circuitry shown in FIG. 6, where a call is initiated through a computer.

FIG. 6 shows the pertinent parts of the network of FIG. 1 used to effectuate a first example of a multimedia telecommunications service in accordance with this invention. In this example of the invention, a multimedia telephone call is created between two telephone service subscribers. The multimedia telephone network receives a directory number of one or more called parties from a calling party. The network determines whether the calling party and at least one called party are subscribers to a multimedia virtual meeting service offered by the network. The network connects the calling party and the called parties to a multimedia services node in the network when it is determined that the calling party and at least one called party are subscribers to this multimedia service. A connection having predefined characteristics is created between the calling party and the called parties. The connection may comprise one or more of a plurality of multiple media connections, such as one or more of audio, video, and data. The predefined characteristics of the connections can include a certain amount of bandwidth allocated to the call so that communications in the selected media may be accommodated. The predefined characteristics of the connections may be stored as default characteristics in a user profile associated with the virtual meeting services node. A subscriber to the multimedia services may communicate desired default characteristics to the network when subscription to the services is initiated. The default characteristics may be modified in the course of a telephone call between subscribers in response to prompts at call set up and the like from the network or in response to unprompted commands entered into the network by the subscribers.

This example of a telecommunications service involves a multimedia telephone call between a multimedia workstation 156 and a multimedia workstation 158. The multimedia workstation 156 comprises a computer 160, a visual display 162 connected to the computer 160, a video camera 164 adjacent the visual display 162, and a telephone 166 connected to the computer 160. Similarly, the workstation 158 comprises a computer 168, a visual display 170 connected to the computer, a video camera 172 adjacent the visual display 170, and a telephone 174 connected to the computer 168. Both video and computer data can be displayed on display 162 and 170 or separate monitors can be used. Likewise, the camera can be adjacent to the display or even be built as an integral part of the display which allows eye-contact video. The data produced by the computer 160 is directed to a frame relay portion 176 of the FIG. 1 network 10 by means of a local area network 178 and a router 180. Data produced by other computers or workstations connected with workstation 156 in a multimedia conference is received by the computer 160 along the same path between the workstation 156 and the frame relay portion 176 of the network 10. The data produced by the computer 168 is directed to the frame relay portion 176 of the network 10 by means of a local area network 182 and a router 184. Data produced by other computers or workstations, such as workstation 156, connected with workstation 158 in a multimedia conference is received by the computer 168 along the same path between the workstation 158 and the frame relay portion 176 of the network 10.

The camera 164 produces a video signal which is directed to the switched portion 186 of the network 10 by means of a codec 188 and a primary rate interface 190. The telephone 166 in the workstation 156 is connected to the computer 160 and produces an audio signal which is directed to a local telephone network 192 which, in turn, is connected to the switched portion 186 of the network 10. The camera 172 produces a video signal which is directed to the switched portion 186 of the network 10 by means of a codec 194 and a primary rate interface 196. The telephone 174 in the workstation 158 is connected to the computer 168 and produces an audio signal which is directed to a local telephone network 198 which, in turn, is connected to the switched portion 186 of the network 10.

The VMS complex contains a local area network 200 which serves to provide connections between a number of servers and bridging resources. The frame relay portion 176 of the network 10 is connected to the local area network 200 by means of a router 202. The frame relay portion 176 of the network 10 is also connected to a data bridge 204 which is used to combine the data streams from the workstations 156 and 158 and to redirect combined data streams back to the workstations 156 and 158. The data bridge is controlled by a VMS data server 206 by means of a control line 208. The switched portion 186 of the network 10 is connected to an audio bridge 210 and a video bridge 212 in the VMS complex 28. A VMS audio server 214 controls the audio bridge 210 by means of a control connection 216. A VMS video server 218 controls the video bridge 212 by means of a control connection 220. The audio bridge 210 is used to combine the audio signals from the workstations 156 and 158 and to redirect the combined audio signals back to the workstations 156 and 158. The video bridge 212 is used to combine the video signal streams from the cameras 164 and 172 and to redirect the combined video signal streams back to the workstations 156 and 158 through the switched portion 186, the primary rate interfaces 190 and 196, the codecs 188 and 194, and connections 222 and 224 between the codecs 188 and 194 and the video displays 162 and 170, respectively. A VMS meeting room server 226 is connected to the local area network 200 which creates and maintains a virtual meeting room in the VMS complex for the multimedia connection between workstations 156 and 158. A VMS call processor 228 handles calls made to the VMS complex 28. One function of the call processor 228 is to look up information about calling and called parties stored in a user profile 230.

FIGS. 7–11 are flow charts representing a call flow associated with a first example of a multimedia telephone service implementable on a network shown in FIG. 6. For purposes of illustration the following description of that call flow assumes that workstation 156 in FIG. 6 initiates a multimedia telephone call to workstation 158 in FIG. 6. The user of workstation 156 initially brings up the VMS service on the workstation 156 in block 234. A data connection is established in block 236 with the VMS complex 28 through the local area network 178, router 180, frame relay portion 176, and router 202. Alternatively, this may be accomplished in one example of this invention by the user dialing a telephone number, for example, a toll free telephone number such as an 800 number, on the telephone 166. Alternatively, the phone call could be a feature group D (FG-D) phone call. Once the call has been received and the connection between the workstation 156 and the VMS complex 28 has been established, security procedures which authenticate the user of the workstation 156 as an authorized VMS subscriber are performed in block 238. These security measures may be in the form of the VMS complex requesting or prompting the user of the workstation 156 to enter a password which is then checked against a list of authorized passwords stored in the VMS complex 28. If the user enters a correct password, the VMS complex presents the user with a menu of options relating to the VMS service in block 240. These options may be displayed to the user on the visual display 162 in the workstation 156. Those options include calling another person illustrated in block 242 in FIG. 7, joining an existing meeting shown in block 244, restarting a suspended meeting shown in block 246, and reviewing an old or existing meeting as shown in block 248. The options presented to a user may also include an option shown in block 250 to browse through the user's existing files stored, for example, in the conference storage database 118 in FIG. 2. Finally, in this example, the options presented to the user may also include an option to initiate a network blackboard or to restart an existing network blackboard as illustrated in block 252.

Figure 8:
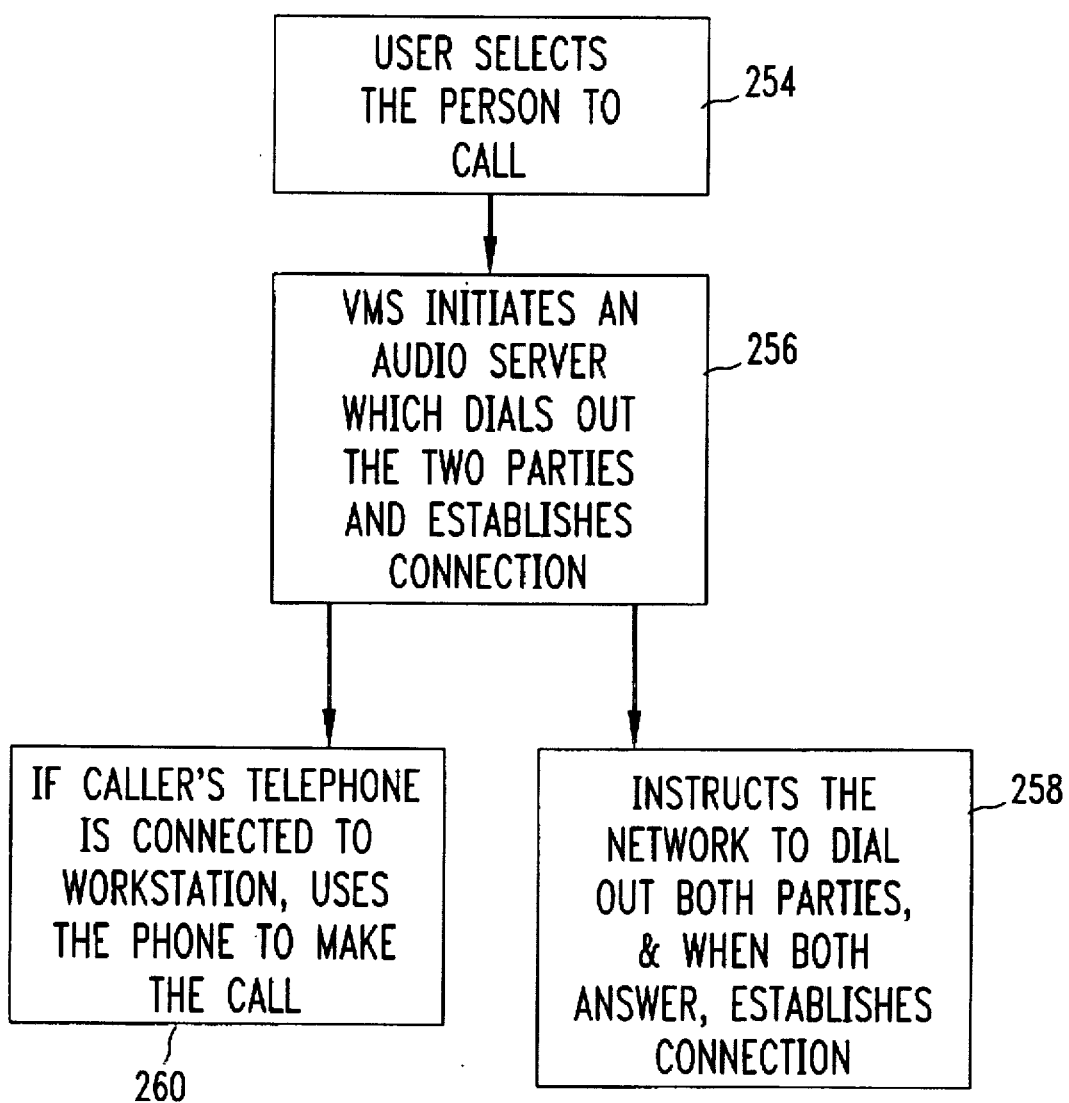

FIG. 8 illustrates the call flow associated with the user of workstation 156 selecting the option to call another person in block 242. In response to the prompt to enter information about a called party in block 242, the user selects the person to call in block 254, in this case the person associated with the workstation 158. This selection may be made by the user of workstation 156 entering the telephone number of the other person into the computer 160 through a keyboard entry, a mouse click, or other data entry procedure. When the VMS complex 28 receives the telephone number of the other person, it initiates an audio server, such as the audio server 214 in FIG. 6, which is instructed in block 256 to place a call to the other person through an audio bridge 210, the switched portion 186, and a local network 198 to the telephone 174 associated with the workstation 158. The audio server 214 also places a call through the audio bridge 210, the switch portion 186, and the local network 192 to the telephone 166 associated with the workstation 156. The audio server 214 then causes the call to the telephone 166 to be bridged with the call to telephone 174. This operation of placing telephone calls to the telephones 166 and 174 is illustrated in block 258 in FIG. 8. Alternatively, if the calling telephone 166 is connected to the computer 160, and if the telephone 166 is equipped with a speaker phone, the audio server 214 may direct the computer 160 to direct the telephone 166 to go off hook and then automatically dial the telephone 166 with the telephone number of the other person selected by the user of the workstation 156. An audio connection between the telephones 166 and 174 may then be established by means of the local network 192, the switched portion 186, and the local network 198 when the user of workstation 158 answers the telephone 174. This operation is represented in block 260 in FIG. 8.

Figure 9:
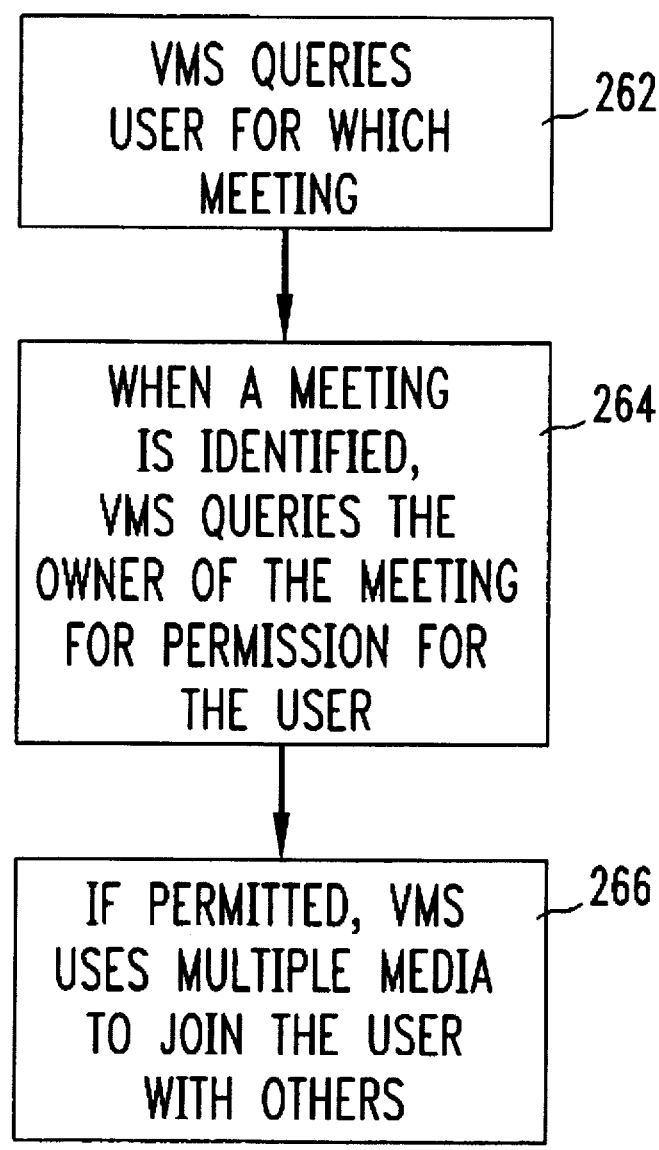

FIG. 9 illustrates the operation of the network shown in FIG. 6 when the user of workstation 156 opts to join an existing meeting being handled in the network. When the user selects this option, the VMS complex 28 queries the user in block 262 about which meeting the user would like to join. When the user of workstation 156 has identified a meeting he or she would like to join, the VMS complex 28 then queries an owner of the meeting in block 264 whether permission should be granted to the user of workstation 156 to enter the requested meeting. If permission is granted, the VMS complex then instructs in block 266 the audio, video, and data servers associated with the meeting to join the user of workstation 156 to the meeting.

Figure 10:
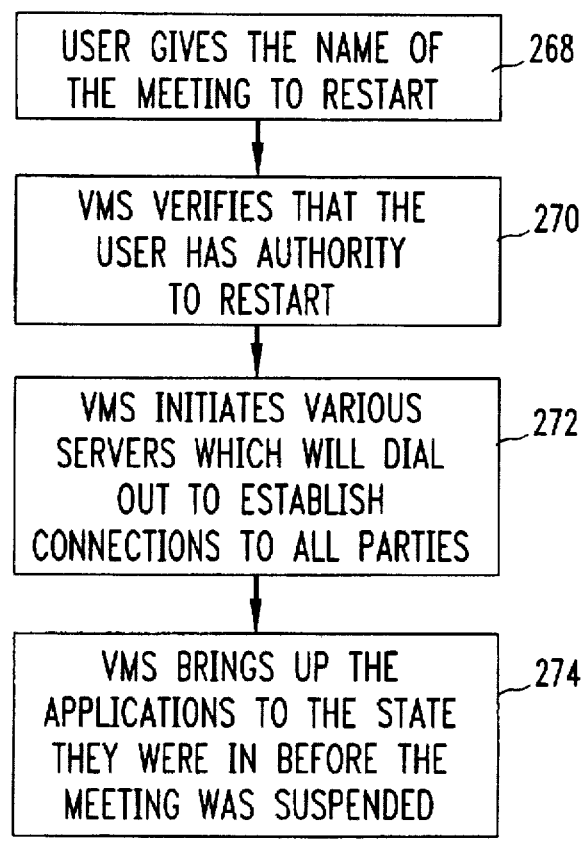

If the user of workstation 156 opts to restart a suspended meeting, the user first gives the name of the virtual meeting room and meeting he or she wishes to restart in block 268 in FIG. 10. This may be made in response to a query generated by the VMS complex in response to the user of workstation 156 selecting this option. The VMS complex 28 then verifies that the user of the workstation has the authority to restart this meeting in block 270. The complex 28 then initiates appropriate media servers in block 272 which dial out and establish the appropriate connections between the parties associated with the meeting selected by the user of workstation 156. The VMS complex 28 also brings up to all the conferees in block 274 the applications used in the meeting to the state they were in just before the meeting was suspended.

Figure 11:
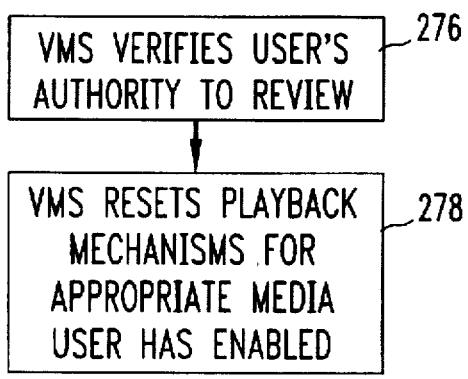

If the user of workstation 156 chooses to review a prior meeting, the VMS complex 28 first verifies the user's authority to review that meeting in block 276 shown in FIG. 11. In block 278, the complex 28 then resets playback mechanisms associated with the conference storage database 118 for the media selected by the user of workstation 156.

Note that the example in FIG. 6 used three separate networks for the different media. Similar connectivity can be achieved if one or more of the participants use integrated access for all the media. For example, workstation 156 could be connected to an ISDN network through a PRI access using H0 (384 k Bit) interface. The audio portion may use 1-DS0, data may use 1-DS0, and the video may use 4-DS0. In this case, the frame relay network will not be used and connections to all the bridges will come from the switched network. Similarly, a user could use integrated access through an ATM or B-ISDN network.

Figure 12:
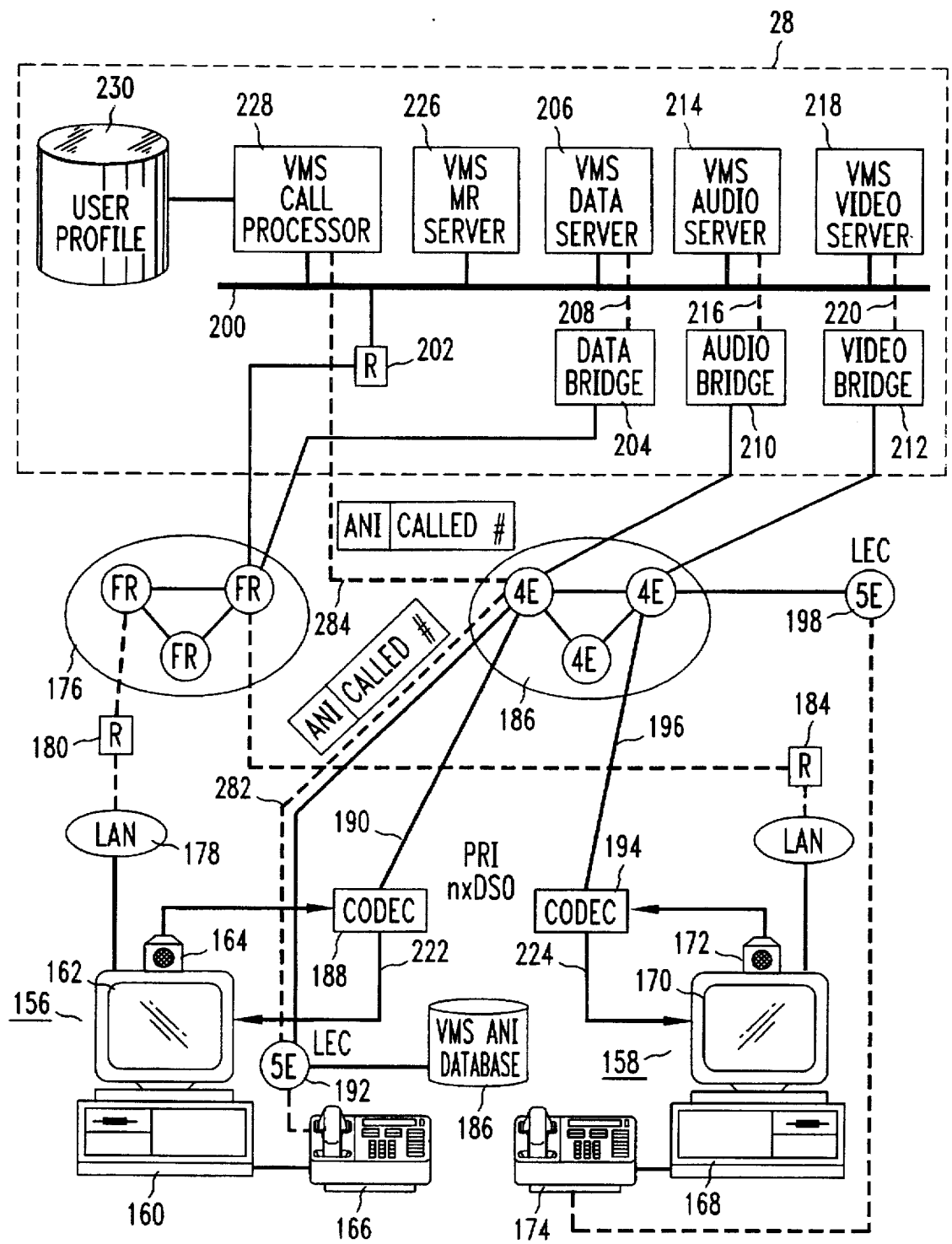
FIG. 12 is a circuit diagram of pertinent aspects of the telecommunications network of FIG. 1 illustrating a second example of a multimedia telecommunications service in accordance with this invention.
Figure 13:
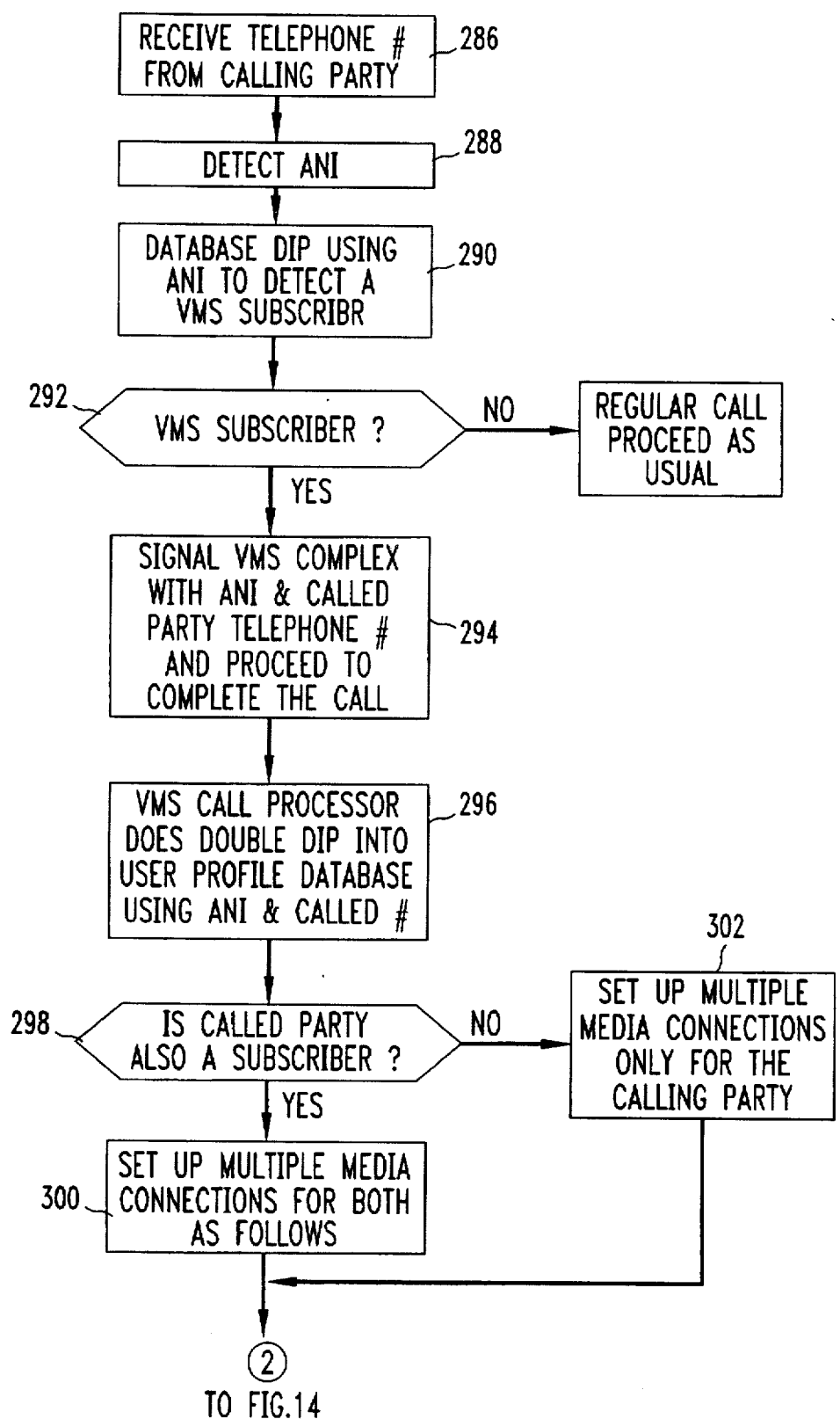
FIGS. 13–19 are flow charts representing the operation of the network circuitry shown in FIG. 12.

FIG. 12 is a diagram of pertinent parts of the FIG. 1 network architecture used to implement a second example of a multimedia telecommunications service in accordance with this invention. A telephone call is created between a calling party and a called party in a telephone network. The network automatically identifies the multimedia capabilities of the calling party and the called party in response to a call initiated by the calling party. In specific terms, the network identifies the media in which the parties can communicate, such as one or more of audio, video, and data. The network connects the calling party to the called party in one or more of the plurality of media depending on the wishes of the parties to the telephone call. In specific terms, the network identifies the capabilities of the calling party by detecting the automatic number identification (ANI) of the calling party and the directory number of the called party as dialed by the calling party. The network may address a database or user profile with the ANI and the directory number and may retrieve information about the media capabilities of the parties stored in the database in places associated with the ANI and the directory number. The network may compare the retrieved data for the calling party and the called party to see if there is any mismatch in the media communications capabilities of those parties. The mismatch identified may include the fact that the calling party and the called party cannot communicate in the same media, for example, the calling party may communicate in audio, video, and data, but the called party can only communicate in audio and video. In addition to a mismatch between media capabilities, the network may also recognize that there may be incompatibilities between the communications equipment of the calling party and the called party, for example, characteristics of computers used for data communications by the two parties may be different in terms of the kids of computers used and the kinds of operating systems used on those computers. The network will appropriately configure interface equipment to permit parties having these incompatibilities to communicate with one another in selected media.

The architecture of FIG. 12 is similar to that of FIG. 6 and like elements in FIG. 12 have been given the same reference numerals that they have been given in FIG. 6. The architecture of FIG. 12 includes a VMS automatic number identification (ANI) database 280 which is used to detect if a calling party such as the user of the workstation 156 is a subscriber to the virtual meeting service offered by the network 10. The database 280 is shown in FIG. 12 as being connected to a local network 192. Such a database may be connected to any convenient node in the telecommunications network, such as one of the nodes in the switched portion 186 of a long distance network. FIG. 12 shows a signaling path 282 between the local network 192 and the switched portion 186 of the long distance network. FIG. 12 also shows a signalling path 284 between the switched portion 186 and the VMS complex 28. As illustrated in FIG. 12, these signalling paths are used to communicate a telephone number dialed by the user of the workstation 156 and the ANI of the telephone 166 to the VMS complex 28.

FIGS. 13–19 are flow charts representing the operation of the apparatus shown in FIG. 12 to effectuate a multimedia call from the workstation 156 to the workstation 158. Multimedia connections between those workstations 156 and 158 are automatically set up in response to simply dialing the regular directory number of the workstation 158 by the user of workstation 156 on the telephone 166. When the user of workstation 156 wishes to call a user of workstation 158, the user of workstation 156 initiates the call by dialing the. telephone number of the workstation 158 on the telephone 166. The telephone number dialed by the user of workstation 156 is received in the local telephone network 192 in block 286 in FIG. 13. The ANI then is detected in block 288 and a look up in the database 280 is made using the detected ANI in block 290 to detect if the caller is a VMS subscriber. If the calling party is not a VMS subscriber, then the call is allowed to proceed in the usual manner as illustrated in the no output of the block 292. If the calling party is a VMS subscriber, in block 294, the local network sends the dialed telephone number and the ANI to the VMS call processor 228 in the VMS complex 28 over the signalling lines 282 and 284. The local network 192 also continues to complete the phone call in the normal manner in addition to signalling the VMS complex on lines 282 and 284. In block 296, the VMS call processor 228 then does a double look up of the called number and the ANI in the user profile 230. The user profile 230 may contain information about which media the calling party and the called party are capable of using to communicate with one another. In this example, the users of workstations 156 and 158 are capable of communicating in audio, video, and data. The user profile may also contain default information regarding which media connections should be made absent special direction from the parties. For example, the user profile may contain information that these parties are to be automatically connected together in all media but video for all calls even though both parties are capable of effectuating video conferences. The video connections will only be made if specifically requested by both parties in this example. In other examples, the profile may indicate that these users are to be automatically connected in all media, or some subset of their media capabilities, whenever a call is made from one to the other. In block 298, a check is made to see if the called party is also a VMS subscriber. If the called party is a VMS subscriber, connections in multiple media are set up in block 300 in accordance with the directions stored in the user profile 230 as modified by any overrides agreed to by the parties. If it is determined, in block 298, that only the calling party is a VMS subscriber, then multiple media connections are set up only for the calling party in block 302. These multiple media connections are set up in case a VMS subscriber is added to the conference between the VMS subscriber using workstation 156 and the nonVMS subscriber using workstation 158.

Figure 14:
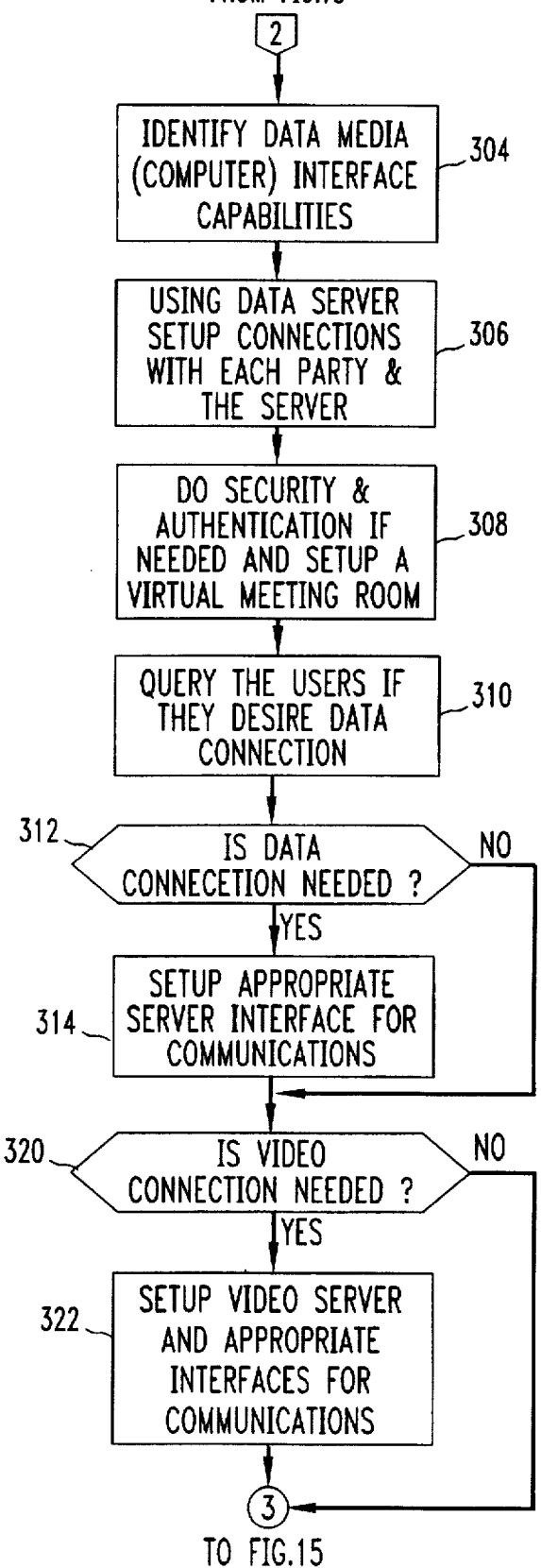

After the completion of the operation of either one of blocks 300 or 302, the operation of the network proceeds to block 304 in FIG. 14 where a check is made based on the previously described look up to ascertain the data capabilities and characteristics of the workstations associated with the VMS subscribers who are parties to the conference. For example, there may be information stored in the user profile 230 about the kinds of computers used in the workstations 156 and 158. This information may include the computer manufacturer and model number, as well as any relevant characteristics of those computers such as communications capabilities and operating systems used by the computers, such as MS-DOS®, MS-DOS Windows®, UNIX®, and Macintosh operating systems. This check permits the VMS complex to call upon appropriate resources, such as appropriate bridges having appropriate interfaces to be used between dissimilar equipment as identified by the look up in the user profile. A VMS data server 206 is called upon in block 306 to set up data connections between the parties using appropriate data bridging resources as required in light of the user profile associated with the two workstations 156 and 158. The calling party is authenticated in block 308 and a virtual meeting room named by the calling party is set up in a VMS meeting room server 226.

Figure 16:
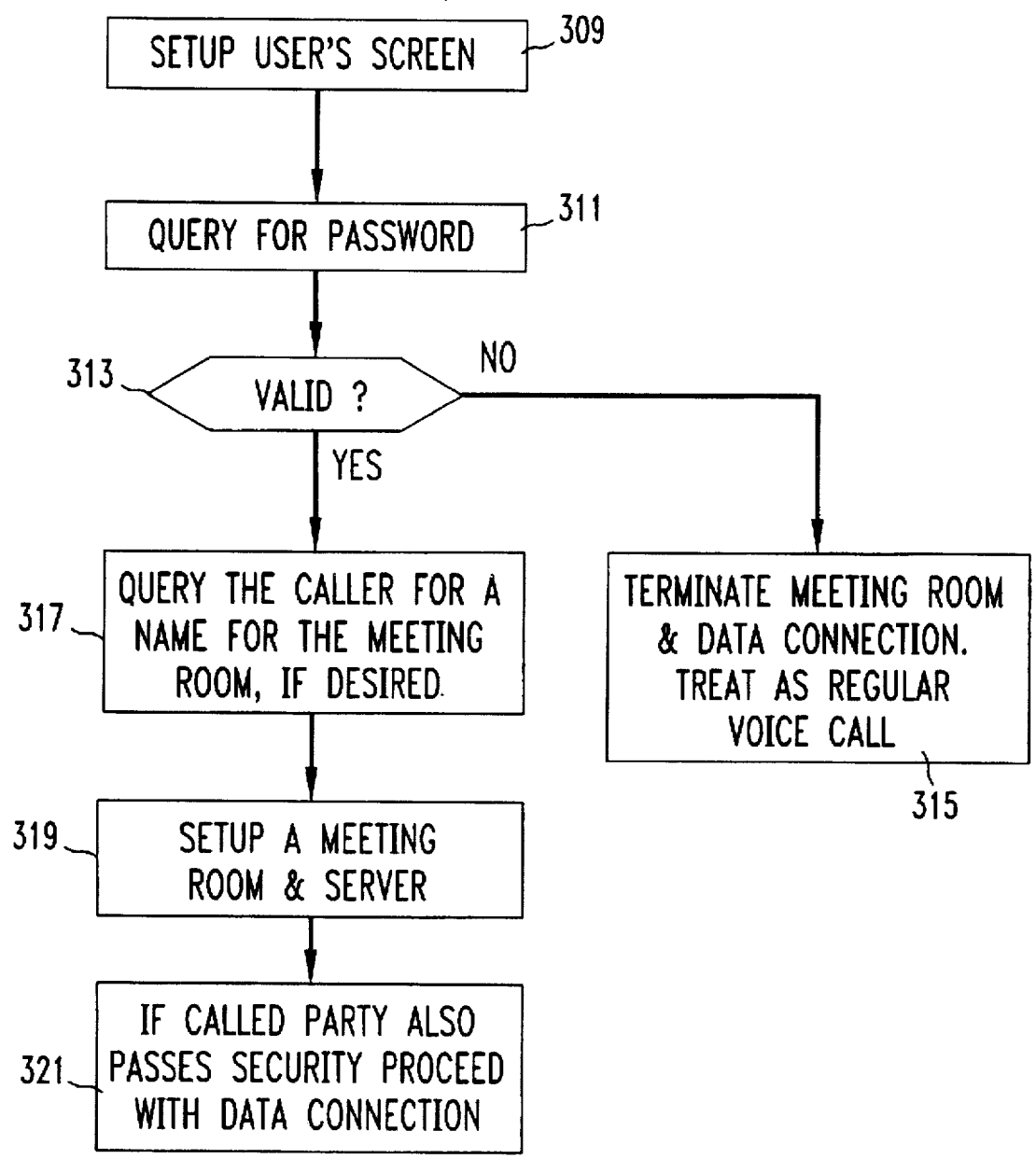

The details of the operation of block 308 are illustrated in the flow chart of FIG. 16. In FIG. 16, the user screen is set up and sent to the user in block 309. The user is queried for his password in block 311. If the password is invalid, as determined in block 313, the meeting room is terminated along with any data connection in block 315. The call is then treated as a regular voice call. If the user enters a valid password, as determined in block 313, then the caller is asked to name the virtual meeting room in block 317 if the caller desires to do so. A virtual meeting room is set up in block 319 and a data connection is set up in block 321 if the called party also passes a security check.

Figure 17:
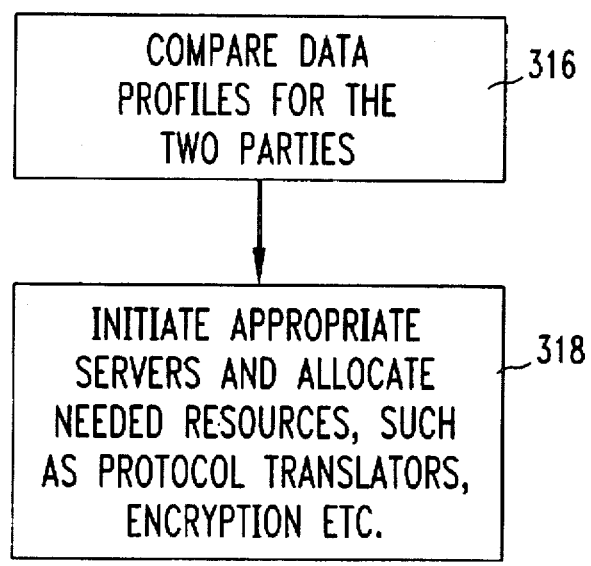

After the authentication of block 308 in FIG. 14, the users of the workstations 156 and 158 are queried in block 310 if they desire a data connection between them. If they indicate that a data connection is desired in block 312, then appropriate server interfaces needed for data communications are set up in block 314. The details of this operation are illustrated in the flow chart of FIG. 17. As shown in FIG. 17, the data profiles for the two parties are compared in block 316. Appropriate data servers are initiated and needed resources, such as protocol translators, encryption devices, and the like are allocated to the meeting in block 318.

Figure 18:
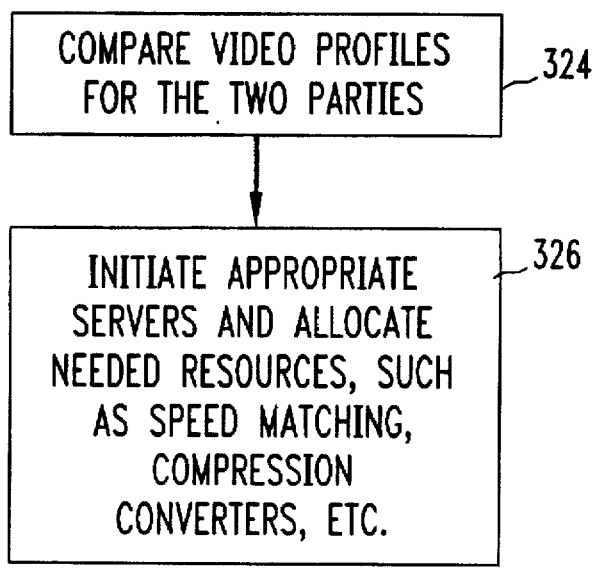

At the completion of the operation of block 312 in FIG. 14 or if it is determined that no data connection is needed in block 312, a query is sent to the parties in block 320 to see if they require a video connection between them. If they do, an appropriate video server is set up and appropriate communications interfaces are established in block 322. The details of the operation of block 322 are illustrated in FIG. 18. In FIG. 18, the video profiles for the two parties are compared in block 324 and appropriate servers are initiated in block 326. The required resources, such as speed matching circuitry, compression converters, and the like are allocated as needed so that the user of workstation 156 may communicate in video with the user of workstation 158.

Figure 15:
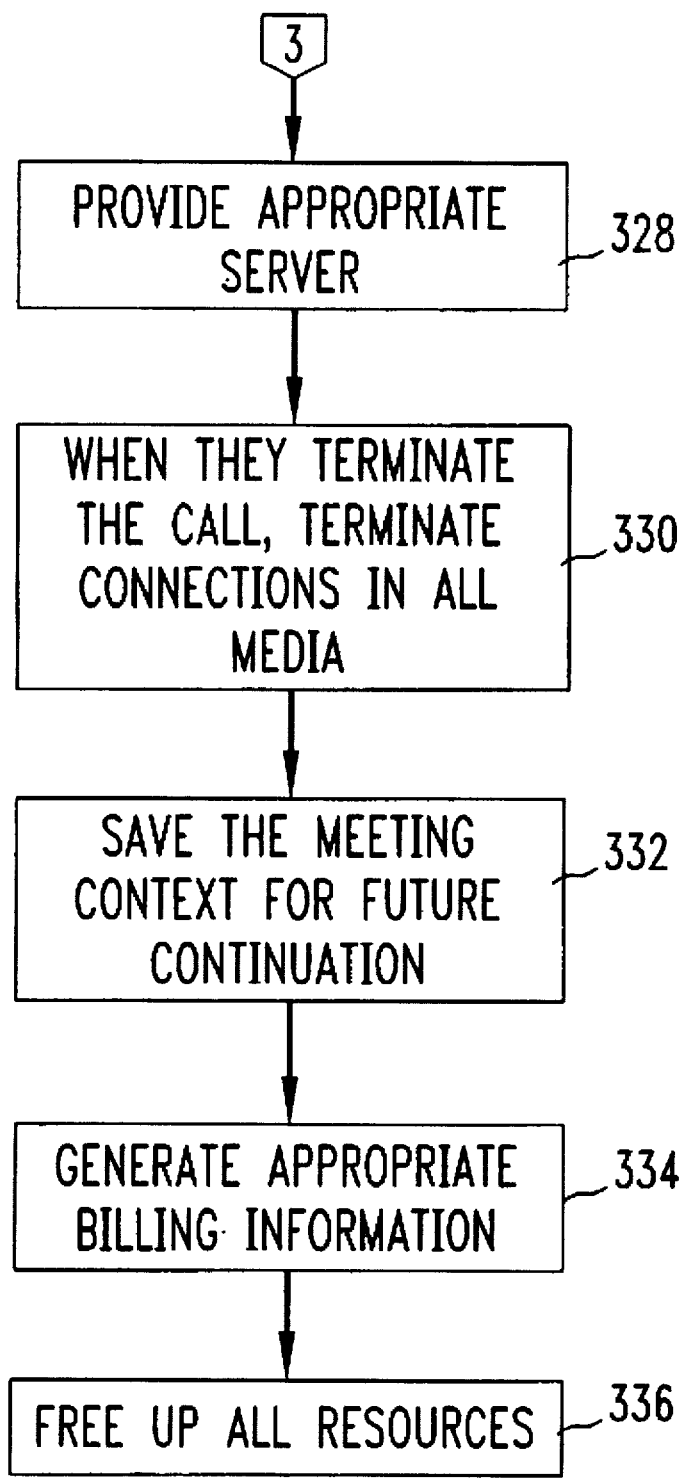

When the operation of block 322 in FIG. 14 has been completed or the parties have indicated that a video connection is not required as determined in block 320, the operation of the network of FIG. 12 then proceeds to the beginning of the flow chart shown in FIG. 15. Appropriate service is first provided in block 328. This service may include one or more of audio, video, and data communications, a shared network blackboard, shared applications, ability to add additional parties, and the like. When the parties terminate the call, all media connections are terminated in block 330. Predetermined portions of the meeting, for example, predetermined segments of the audio, video, and data generated in the course of the meeting may be saved in conference storage device 118 as desired by the parties in block 332. Appropriate billing information for the telephone services rendered may be generated in block 334. All resources may be freed up in block 336.

Figure 19:
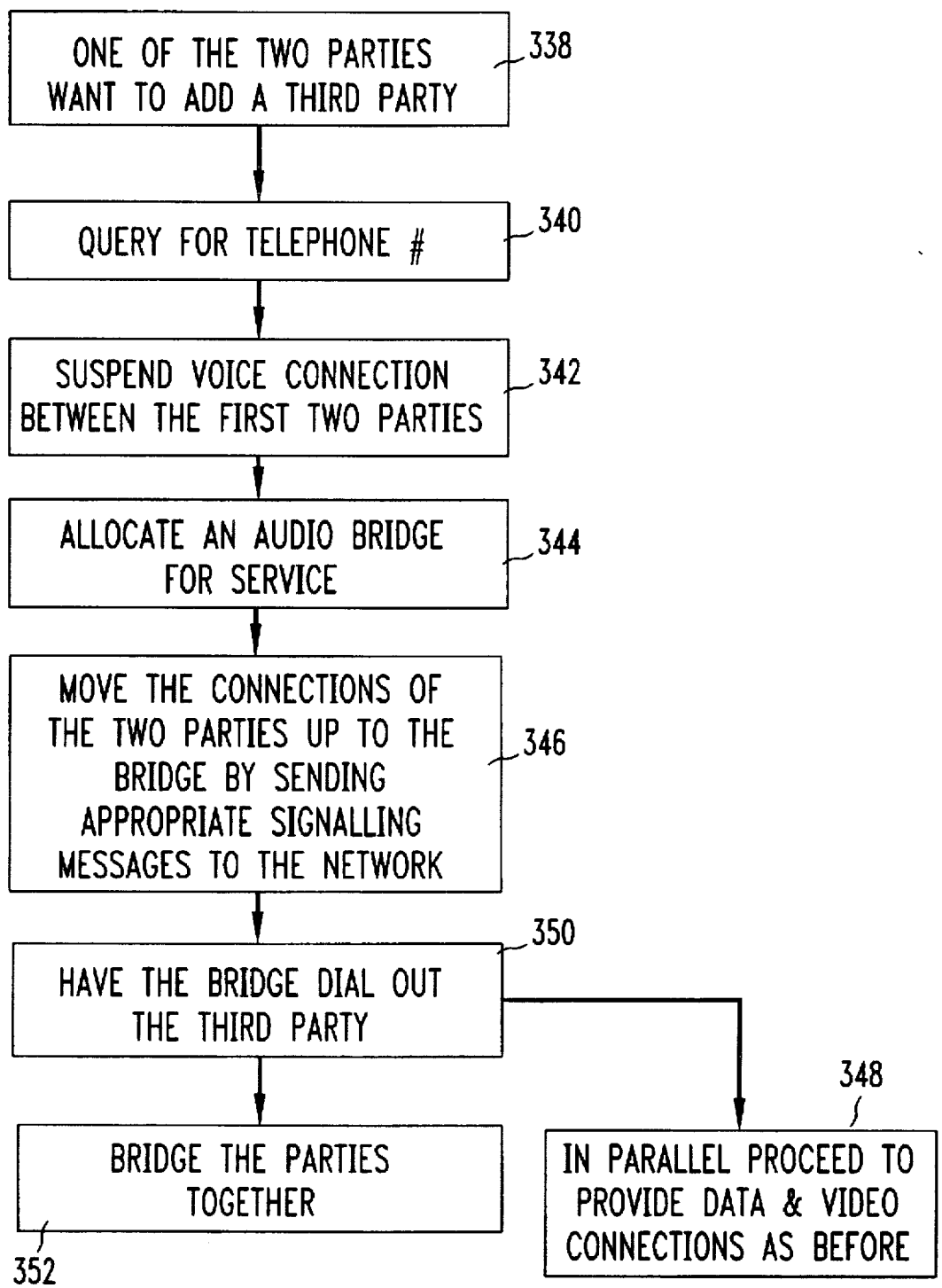

When one or both of the parties involved in the multimedia call between workstations 156 and 158 desire to add an additional party to their conference, the network follows the flow chart illustrated in FIG. 19. One of the parties first indicates to the network that there is a desire to add an additional party. This indication is received by the network in block 338. The VMS complex 28 then queries the user indicating a desire to add a party for the telephone number of the party to be added in block 340. The voice connection between the first two parties then is suspended by the VMS complex in block 342. An audio bridge, if not already a part of the conference, then is allocated to the conference in block 344. In situations where more than two parties are already a part of the conference and are using an audio bridge, the audio suspension in block 342 and the bridge allocation in block 344 are unnecessary. It is only necessary to add an additional voice connection associated with the additional party to the bridging circuit already a part of the conference. The connections of the parties are then transferred to the bridge in block 346 by sending appropriate signalling messages to the network. In parallel, as indicated in block 348, data and video connections are provided. To actually connect the additional party to the conference, the audio bridge dials out the telephone number of the additional party in block 350 and bridges all the parties together including the new party in block 352.

In light of the foregoing, it can be seen that this invention involves creation of a multimedia telephone call between at least two multimedia telephone service subscribers. A telephone call is received in a multimedia telecommunications network from a calling party placed to a multimedia services node or other telecommunications equipment capable of providing multimedia telecommunications services in the network. Multimedia connections are automatically established by the telecommunications network between the calling party and at least one called party in response to receipt of the telephone call. The telephone call could be a data call, an audio call, or an audio visual call. The multimedia telecommunications network may comprise a number of different telecommunications networks each of which is specially suited to handling a specific one of a plurality of multiple media. For example, there may be a conventional switched telephone network such as the usual public switched telephone network for handling relatively low speed voice band communications and the like. The switched telephone network could be associated with a high speed packet network such as a frame relay network, an asynchronous transfer mode network, or a packet network using synchronous modes of operation. The networks in the multimedia telecommunications network in accordance with this invention may be entirely electrical, partly electrical and partly optical, or entirely optical in nature. A multimedia services node in accordance with this invention is capable of interfacing the various networks making up the multimedia telecommunications network. The services node is connected to both the switched portion of the multimedia network and the packet portion of the multimedia network. The node facilitates the completion of multimedia telephone calls between users of the switched portion of the multimedia network and users of the packet portion of the network. The multimedia telecommunications network may receive signals from a user connected to the switched portion of the network and signals from a user connected to the packet portion of the network. An interface in the network responds to signals from these users to complete a multimedia call between those users. Both integrated access and nonintegrated access to the multimedia network is possible. In a nonintegrated access situation, a user sends and receives signals in different media to and from different network portions of the multimedia telecommunications network. Specifically, the telecommunications network may handle signals in a first medium, such as audio, of a user connected to the switched portion of the network and signals of that same user in a second medium, such as video or data, connected to the packet portion of the network. In an integrated access situation, a user sends and receives all signals in all media to and from one particular part of the telecommunications network such as the ATM portion of the network shown in FIG. 1. In both cases of integrated and nonintegrated access, a multimedia telecommunications network in accordance with this invention is able to complete multimedia telephone calls between subscribers of multimedia telecommunication services. That network will also be able to complete multimedia telephone calls between users connected to different kinds of networks such as switched networks and packet networks. In addition to being useful for multimedia networks having a plurality of different components such as a switched portion and a packet portion, this invention is also useful in situations involving one uniform network capable of handling signals for all media such as high bandwidth electro-optical and all optical networks.

In addition to automatically establishing predetermined multimedia connections between two or more multimedia services subscribers, this invention is capable of creating a multimedia telephone call in the network solely between a multimedia services subscriber and a node or other equipment in the network which effectuates multimedia telecommunications services for subscribers. The network may receive a call from a calling party to a multimedia services node. After the calling party has been authenticated as a multimedia services subscriber by the multimedia services equipment in the network, the call to the services node may be completed by the network establishing predetermined multimedia connections between the calling party and the node. This is a mechanism by which a subscriber can be allowed to observe certain information about predetermined multimedia conferences which have been held in the network and which information has been stored in the network for future use, for example, in the conference storage facilities in the like described in detail above. The information stored in the network created in the course of a prior multimedia conference can include some or all of the audio and video portions of the conference as well as some or all of the data generated in the course of running computer programs and the like which was shared by the conference participants.

We claim:

1. A multimedia telecommunications network comprising:

at least one node for connecting at least two subscribers;

audio, video and data bridges for connecting subscribers having different telecommunications capabilities; and at least one virtual meeting services complex that is accessible to the subscribers, the virtual meeting services complex being associated with at least one of the at least one node for providing a multimedia telecommunications service for the subscribers, wherein the virtual meeting services complex includes a controllably persistent virtual meeting room for supporting multimedia telecommunications including any two of audio, video and data communications, the meeting room being controllably persistent in that the audio, video and data communications from an initial multimedia conference call are stored in a memory of the multimedia telecommunications network such that any two of the audio, video and data communications from the initial multimedia conference call are available to one or more subscribers at a time subsequent to when all subscribers are off the initial multimedia conference call.

2. A method of creating a multimedia call between at least two subscribers, comprising the steps of:

receiving a telephone call from a calling party placed to a virtual meeting services complex in a multimedia telecommunications network;

creating a virtual meeting room in the multimedia telecommunications network in response to the telephone call and connecting the calling party to the virtual meeting room, wherein the virtual meeting room persists in the multimedia telecommunications network;

establishing a connection between at least two subscribers in the virtual meeting room; and providing an interface to allow subscribers with different telecommunications capabilities to effectuate the multimedia call.

3. The method of claim 2, in which the receiving step comprises receiving a call at a toll free telephone number associated with the virtual meeting services complex.

4. The method of claim 3, in which the toll free telephone number is an 800 telephone number.

5. The method of claim 2, in which the receiving step comprises receiving a feature group D telephone call.

6. The method of claim 2, further comprising the step of prompting the calling party for predetermined information in response to receiving the telephone call to the virtual meeting services complex.

7. The method of claim 6, wherein the calling party is prompted to provide information about a called party.

8. The method of claim 6, in which the prompting step comprises prompting the calling party for authentication information.

9. A method of creating a multimedia call between at least two subscribers, comprising the steps of:
   receiving a directory number of at least one called party from a calling party to initiate the multimedia call;
   determining whether the calling party and at least one of the at least one called party are subscribers to a virtual meeting services complex offered by the multimedia telecommunications network;
   determining a telecommunications capability of the subscribers;
   providing an interface to allow subscribers with different telecommunications capabilities to effectuate the multimedia call; and
   connecting the subscribers to a node in the multimedia telecommunications network.

10. The method of claim 9, further comprising the step of:
    creating a connection having predefined characteristics between the calling party and each called party that is determined to be a subscriber.

11. The method of claim 10, in which the connection comprises one or more of a plurality of multiple media connections.

12. The method of claim 11, in which the multiple media are selected from the group consisting of audio, video, and data.

13. The method of claim 10, in which the predefined characteristics comprise a bandwidth associated with the connection.

14. The method of claim 10, in which the predefined characteristics are default characteristics determined when the calling party subscribe to the virtual meeting services complex.

15. The method of claim 10, in which the predefined characteristics are determined as a result of prompts made to the calling party at a multimedia call setup.

16. A method of effectuating a multimedia call between a calling party and at least one called party in a multimedia telecommunications network, the calling party and the at least one called party being subscribers to the virtual meeting services complex, comprising the steps of:
    automatically identifying a telecommunications capability of a calling party and at least one of the at least one called party to communicate in one or more of a plurality of media in response to a call placed by the calling party to the at least one called party, the plurality of media including audio, video and data;
    providing an interface to allow subscribers with different telecommunications capabilities to effectuate the multimedia call; and
    connecting the subscribers in one or more of the identified media.

17. The method of claim 16, in which the identifying step comprises the step of detecting an ANI of the calling party and a directory number of the at least one of the at least one called party.

18. The method of claim 17, in which the identifying step comprises the step of addressing a database with the ANI and the directory number and retrieving information about a telecommunications capability of the calling party and the at least one of the at least one called party stored in a database for the ANI and directory number.

19. The method of claim 16, in which the identifying step comprises the step of determining whether there is a mismatch between the communication characteristics of the calling party and the called party.

20. The method of claim 19, in which the mismatch comprises different telecommunication capabilities between the calling party and each called party.

21. The method of claim 19, in which the mismatch comprises an incompatibility between the calling party and the called party within at least one of the media.

22. A method of creating a multimedia call between at least two subscribers, comprising the steps of:
    receiving a call from a calling party placed to a multimedia services node in a telecommunications network;
    automatically identifying capabilities of communications equipment of the calling party and communications equipment of each of a plurality of called parties;
    automatically identifying incompatibilities between communications equipment of the calling party and communications equipment of each of the plurality of called parties; and
    automatically establishing predetermined multimedia connections involving audio, video and data communications between the calling party and at least one called party in response to receipt of the call from the calling party.

23. The method of claim 22, in which the call comprises a data call.

24. The method of claim 22, in which the call comprises an audio telephone call.

25. The method of claim 22, in which the call comprises an audio visual call.

26. The method of claim 22, in which the telecommunications network comprises a public switched telephone network.

27. The method of claim 22, in which the telecommunications network comprises a frame relay network.

28. The method of claim 22, in which the telecommunications network comprises an asynchronous transfer mode network.

29. The method of claim 22, in which the telecommunications network comprises an X.25 data network.

30. A method of creating a multimedia call in a multimedia telecommunications network, comprising the steps of:
    receiving a call from a calling party placed to a multimedia services node in the multimedia telecommunications network;
    automatically identifying capabilities of communications equipment of the calling party and communications equipment of each of a plurality of called parties;
    automatically identifying incompatibilities between communications equipment of the calling party and communications equipment of each of the plurality of called parties; and
    automatically completing the call to the node by establishing predetermined multimedia connections involving audio, video and data communications between the calling party and the node.

31. A multimedia telecommunications network, comprising:

a switched telecommunications network;

a packet telecommunications network;

a multimedia telecommunication services node connected to the switched telecommunications network and the packet telecommunications network for completing multimedia calls between subscribers to the multimedia telecommunications network, wherein the multimedia call includes audio, video and data; and a virtual meeting services complex that is accessible to the subscribers, the virtual meeting services complex being associated with the node for providing a multimedia telecommunications service for the subscribers, wherein the virtual meeting services complex includes a controllably persistent virtual meeting room for supporting multimedia telecommunications including any two of audio, video and data communications, the meeting room being controllably persistent in that the audio, video and data communications from an initial multimedia conference call are stored in a memory of the multimedia telecommunications network such that any two of the audio, video and data communications from the initial multimedia conference call are available to one or more subscribers at a time subsequent to when all subscribers are off the initial multimedia conference call.

32. The multimedia telecommunications network of claim 31, further comprising:

means for receiving first signals from a first subscriber connected to the switched telecommunications network;

means for receiving second signals from a second subscriber connected to the packet telecommunications network;

an interface means responsive to the first and second signals from the first and second subscribers connected to the switched and packet telecommunications networks for use in completing a multimedia call between the first and second subscribers.

33. The multimedia telecommunications network of claim 31, further comprising:

means for receiving in the switched telecommunications network signals in a first medium from each of said subscribers connected to the switched telecommunications network and the packet telecommunications network;

means for receiving in the packet telecommunications network signals in a second medium from each of said subscribers; and means in the multimedia telecommunications services node for completing a multimedia call between the subscriber connected to the switched telecommunications network and the packet telecommunications network and another subscriber connected to the multimedia telecommunications network.

34. The multimedia telecommunications network of claim 1, wherein the controllably persistent virtual meeting room can be used by subscribers with different telecommunications capabilities, and the same or different subscribers can initiate or continue a multimedia call.

35. The method of claim 2, further comprising:

adapting the virtual meeting room for use by subscribers with different telecommunications capabilities; and allowing the same or different subscribers to initiate or continue the multimedia call.

\* \* \* \* \*